(12) United States Patent
Lamba et al.

(10) Patent No.: US 8,457,263 B2
(45) Date of Patent: *Jun. 4, 2013

(54) METHODS FOR ESTIMATION AND INTERFERENCE SUPPRESSION FOR SIGNAL PROCESSING

(75) Inventors: Gagandeep Singh Lamba, Woodinville, WA (US); Tommy Guess, Lafayette, CO (US); Michael McCloud, San Diego, CA (US); Anand P. Narayan, Boulder, CO (US)

(73) Assignee: Rambus Inc., Sunnyvale, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/205,320

(22) Filed: Aug. 8, 2011

(65) Prior Publication Data

US 2011/0292974 A1 Dec. 1, 2011

Related U.S. Application Data

(63) Continuation of application No. 11/893,707, filed on Aug. 17, 2007, now Pat. No. 8,005,128, which is a continuation-in-part of application No. 11/452,027, filed on Jun. 13, 2006, now Pat. No. 7,715,508, and a continuation-in-part of application No. 11/432,580, filed on May 11, 2006, now Pat. No. 7,697,595, and a continuation-in-part of application No. 11/003,881, filed on Dec. 3, 2004, now abandoned, and a continuation-in-part of application No. 10/686,829, filed on Oct. 15, 2003, now Pat. No. 7,580,448, which is a continuation-in-part of application No. 10/669,954, filed on Sep. 23, 2003, now Pat. No. 7,787,518.

(60) Provisional application No. 60/838,262, filed on Aug. 17, 2006, provisional application No. 60/418,187, filed on Oct. 15, 2002, provisional application No. 60/412,550, filed on Sep. 23, 2002.

(51) Int. Cl.
*H04B 1/00* (2006.01)

(52) U.S. Cl.
USPC .......................................... 375/346; 375/130

(58) Field of Classification Search
USPC ................. 375/144, 147, 148, 346, 347, 348, 375/349, 130, 316; 455/334; 370/320, 335, 370/342

See application file for complete search history.

(56) References Cited

U.S. PATENT DOCUMENTS

| 3,742,201 A | 6/1973 | Groginsky | 235/156 |
| 4,088,955 A | 5/1978 | Baghdady | 325/56 |

(Continued)

FOREIGN PATENT DOCUMENTS

| DE | 4201439 | 7/1993 |
| DE | 0558910 | 9/1993 |

(Continued)

OTHER PUBLICATIONS

US 5,867,441, Feb. 2, 1999, Akamatsu, Hironori (withdrawn).

(Continued)

*Primary Examiner* — Khai Tran
(74) *Attorney, Agent, or Firm* — Barcelo, Harrison & Walker LLP

(57) ABSTRACT

A receiver in a CDMA system comprises a front end processor that generates a combined signal per source. A symbol estimator processes the combined signal to produce symbol estimates. An S-Matrix Generation module refines these symbol estimates based on the sub channel symbol estimates. An interference canceller is configured for cancelling interference from at least one of the plurality of received signals for producing at least one interference-cancelled signal.

62 Claims, 14 Drawing Sheets

U.S. PATENT DOCUMENTS

| | | | | |
|---|---|---|---|---|
| 4,309,769 A | 1/1982 | Taylor, Jr. | | 375/1 |
| 4,359,738 A | 11/1982 | Lewis | | 343/100 |
| 4,601,046 A | 7/1986 | Halpern et al. | | 375/38 |
| 4,665,401 A | 5/1987 | Garrard et al. | | 342/75 |
| 4,670,885 A | 6/1987 | Parl et al. | | 375/1 |
| 4,713,794 A | 12/1987 | Byington et al. | | 365/45 |
| 4,780,885 A | 10/1988 | Paul et al. | | 375/40 |
| 4,856,025 A | 8/1989 | Takai | | 375/40 |
| 4,893,316 A | 1/1990 | Janc et al. | | 375/44 |
| 4,922,506 A | 5/1990 | McCallister et al. | | 375/1 |
| 4,933,639 A | 6/1990 | Barker | | 324/309 |
| 4,965,732 A | 10/1990 | Roy, III et al. | | 364/460 |
| 5,017,929 A | 5/1991 | Tsuda | | 342/427 |
| 5,099,493 A | 3/1992 | Zeger et al. | | 375/1 |
| 5,105,435 A | 4/1992 | Stilwell | | 375/1 |
| 5,109,390 A | 4/1992 | Gilhousen et al. | | 375/1 |
| 5,119,401 A | 6/1992 | Tsujimoto | | 375/14 |
| 5,136,296 A | 8/1992 | Roettger et al. | | 342/26 |
| 5,151,919 A | 9/1992 | Dent | | 375/1 |
| 5,218,359 A | 6/1993 | Minamisono | | 342/383 |
| 5,218,619 A | 6/1993 | Dent | | 375/1 |
| 5,220,687 A | 6/1993 | Ichikawa et al. | | 455/254 |
| 5,224,122 A | 6/1993 | Bruckert | | 375/1 |
| 5,237,586 A | 8/1993 | Bottomley | | 375/1 |
| 5,263,191 A | 11/1993 | Kickerson | | 455/304 |
| 5,271,042 A | 12/1993 | Borth et al. | | 375/101 |
| 5,280,472 A | 1/1994 | Gilhousen et al. | | 370/18 |
| 5,305,349 A | 4/1994 | Dent | | 375/1 |
| 5,325,394 A | 6/1994 | Bruckert | | 375/1 |
| 5,343,493 A | 8/1994 | Karimullah | | 375/1 |
| 5,343,496 A | 8/1994 | Honig et al. | | 375/1 |
| 5,347,535 A | 9/1994 | Karasawa et al. | | 375/1 |
| 5,353,302 A | 10/1994 | Bi | | 375/1 |
| 5,377,183 A | 12/1994 | Dent | | 370/18 |
| 5,386,202 A | 1/1995 | Cochran et al. | | 332/100 |
| 5,390,207 A | 2/1995 | Fenton et al. | | 375/1 |
| 5,394,110 A | 2/1995 | Mizoguchi | | 329/304 |
| 5,396,256 A | 3/1995 | Chiba et al. | | 342/372 |
| 5,437,055 A | 7/1995 | Wheatley, III | | 455/33.3 |
| 5,440,265 A | 8/1995 | Cochran et al. | | 329/300 |
| 5,448,600 A | 9/1995 | Lucas | | 375/205 |
| 5,467,368 A | 11/1995 | Takeuchi et al. | | 375/206 |
| 5,481,570 A | 1/1996 | Winters | | 375/347 |
| 5,506,865 A | 4/1996 | Weaver, Jr. | | 375/205 |
| 5,513,176 A | 4/1996 | Dean et al. | | 370/18 |
| 5,533,011 A | 7/1996 | Dean et al. | | 370/18 |
| 5,553,062 A | 9/1996 | Schilling et al. | | 370/18 |
| 5,553,098 A | 9/1996 | Cochran et al. | | 375/324 |
| 5,600,670 A | 2/1997 | Turney | | 375/208 |
| 5,602,833 A | 2/1997 | Zehavi | | 370/209 |
| 5,644,592 A | 7/1997 | Divsalar et al. | | 375/206 |
| 5,736,964 A | 4/1998 | Ghosh et al. | | 342/457 |
| 5,787,130 A | 7/1998 | Kotzin et al. | | 375/346 |
| 5,844,521 A | 12/1998 | Stephens et al. | | 342/357 |
| 5,859,613 A | 1/1999 | Otto | | 342/463 |
| 5,872,540 A | 2/1999 | Casabona et al. | | 342/362 |
| 5,872,776 A | 2/1999 | Yang | | 370/342 |
| 5,894,500 A | 4/1999 | Bruckert et al. | | 375/346 |
| 5,926,761 A | 7/1999 | Reed et al. | | 455/440 |
| 5,930,229 A | 7/1999 | Yoshida et al. | | 370/203 |
| 5,953,369 A | 9/1999 | Suzuki | | 375/206 |
| 5,978,413 A | 11/1999 | Bender | | 375/206 |
| 5,995,499 A | 11/1999 | Hottinen et al. | | 370/337 |
| 6,002,727 A | 12/1999 | Uesugi | | 375/346 |
| 6,014,373 A | 1/2000 | Schilling et al. | | 370/342 |
| 6,018,317 A | 1/2000 | Dogan et al. | | 342/378 |
| 6,032,056 A | 2/2000 | Reudink | | 455/560 |
| 6,067,333 A | 5/2000 | Kim et al. | | 375/346 |
| 6,078,611 A | 6/2000 | La Rosa et al. | | 375/206 |
| 6,088,383 A | 7/2000 | Suzuki et al. | | 375/148 |
| 6,101,385 A | 8/2000 | Monte et al. | | 455/427 |
| 6,104,712 A | 8/2000 | Robert et al. | | 370/389 |
| 6,115,409 A | 9/2000 | Upadhyay et al. | | 375/144 |
| 6,127,973 A | 10/2000 | Choi et al. | | 342/378 |
| 6,131,013 A | 10/2000 | Bergstrom et al. | | 455/63 |
| 6,137,788 A | 10/2000 | Sawahashi et al. | | 370/342 |
| 6,141,332 A | 10/2000 | Lavean | | 370/335 |
| 6,154,443 A | 11/2000 | Huang et al. | | 370/210 |
| 6,157,685 A | 12/2000 | Tanaka et al. | | 375/346 |
| 6,157,842 A | 12/2000 | Karlsson et al. | | 455/456 |
| 6,157,847 A | 12/2000 | Buehrer et al. | | 455/561 |
| 6,161,209 A | 12/2000 | Moher | | 714/780 |
| 6,163,696 A | 12/2000 | Bi et al. | | 455/436 |
| 6,166,690 A | 12/2000 | Lin et al. | | 342/383 |
| 6,172,969 B1 | 1/2001 | Kawakami et al. | | 370/342 |
| 6,173,008 B1 | 1/2001 | Lee | | 375/148 |
| 6,175,587 B1 | 1/2001 | Madhow et al. | | 375/148 |
| 6,175,588 B1 | 1/2001 | Visotsky et al. | | 375/148 |
| 6,192,067 B1 | 2/2001 | Toda et al. | | 375/144 |
| 6,201,799 B1 | 3/2001 | Huang et al. | | 370/342 |
| 6,215,812 B1 | 4/2001 | Young et al. | | 375/144 |
| 6,219,376 B1 | 4/2001 | Zhodzishsky et al. | | 375/148 |
| 6,222,828 B1 | 4/2001 | Ohlson et al. | | 370/320 |
| 6,230,180 B1 | 5/2001 | Mohamed | | 708/523 |
| 6,233,229 B1 | 5/2001 | Ranta et al. | | 370/330 |
| 6,233,459 B1 | 5/2001 | Sullivan et al. | | 455/456 |
| 6,240,124 B1 | 5/2001 | Wiedeman et al. | | 375/130 |
| 6,252,535 B1 | 6/2001 | Kober et al. | | 341/155 |
| 6,256,336 B1 | 7/2001 | Rademacher et al. | | 375/140 |
| 6,259,688 B1 | 7/2001 | Schilling et al. | | 370/342 |
| 6,263,208 B1 | 7/2001 | Chang et al. | | 455/456 |
| 6,266,529 B1 | 7/2001 | Chheda | | 455/436 |
| 6,275,186 B1 | 8/2001 | Kong | | 342/363 |
| 6,278,726 B1 | 8/2001 | Mesecher et al. | | 375/148 |
| 6,282,231 B1 | 8/2001 | Norman et al. | | 375/144 |
| 6,282,233 B1 | 8/2001 | Yoshida | | 375/148 |
| 6,285,316 B1 | 9/2001 | Nir et al. | | 342/357.09 |
| 6,285,319 B1 | 9/2001 | Rose | | 342/449 |
| 6,285,861 B1 | 9/2001 | Bonaccorso et al. | | 455/137 |
| 6,295,311 B1 | 9/2001 | Sun | | 375/147 |
| 6,301,289 B1 | 10/2001 | Bejjani et al. | | 375/144 |
| 6,304,618 B1 | 10/2001 | Hafeez et al. | | 375/341 |
| 6,307,901 B1 | 10/2001 | Yu et al. | | 375/341 |
| 6,308,072 B1 | 10/2001 | Labedz et al. | | 455/448 |
| 6,310,704 B1 | 10/2001 | Dogan et al. | | 359/127 |
| 6,317,453 B1 | 11/2001 | Chang | | 375/140 |
| 6,321,090 B1 | 11/2001 | Soliman | | 455/440 |
| 6,324,159 B1 | 11/2001 | Mennekens et al. | | 370/203 |
| 6,327,471 B1 | 12/2001 | Song | | 455/440 |
| 6,330,460 B1 | 12/2001 | Wong et al. | | 455/562 |
| 6,333,947 B1 | 12/2001 | van Heeswyk et al. | | 375/148 |
| 6,351,235 B1 | 2/2002 | Stilp | | 342/357.06 |
| 6,351,642 B1 | 2/2002 | Corbett et al. | | 455/442 |
| 6,359,874 B1 | 3/2002 | Dent | | 370/342 |
| 6,362,760 B2 | 3/2002 | Kober et al. | | 341/141 |
| 6,363,104 B1 | 3/2002 | Bottomley | | 375/148 |
| 6,377,636 B1 | 4/2002 | Paulraj et al. | | 375/346 |
| 6,380,879 B2 | 4/2002 | Kober et al. | | 341/155 |
| 6,385,264 B1 | 5/2002 | Terasawa et al. | | 375/371 |
| 6,396,804 B2 | 5/2002 | Odenwalder | | 370/209 |
| 6,404,760 B1 | 6/2002 | Holtzman et al. | | 370/342 |
| 6,414,949 B1 | 7/2002 | Boulanger et al. | | 370/335 |
| 6,426,973 B1 | 7/2002 | Madhow et al. | | 375/231 |
| 6,430,216 B1 | 8/2002 | Kober | | 375/148 |
| 6,457,685 B1 | 10/2002 | Taylor | | 248/166 |
| 6,459,693 B1 | 10/2002 | Park et al. | | 370/342 |
| 6,466,611 B1 | 10/2002 | Bachu et al. | | 375/144 |
| 6,501,788 B1 | 12/2002 | Wang et al. | | 375/148 |
| 6,515,980 B1 | 2/2003 | Bottomley | | 370/342 |
| 6,522,683 B1 | 2/2003 | Smee et al. | | 375/144 |
| 6,570,909 B1 | 5/2003 | Kansakoski et al. | | 375/148 |
| 6,570,919 B1 | 5/2003 | Lee | | 375/233 |
| 6,574,270 B1 | 6/2003 | Madkour et al. | | 375/148 |
| 6,580,771 B2 | 6/2003 | Kenney | | 375/346 |
| 6,584,115 B1 | 6/2003 | Suzuki | | 370/441 |
| 6,590,888 B1 | 7/2003 | Ohshima | | 370/342 |
| 6,594,318 B1 | 7/2003 | Sindhushayana | | 375/262 |
| 6,661,835 B1 | 12/2003 | Sugimoto et al. | | 375/148 |
| 6,668,011 B1 | 12/2003 | Li et al. | | 375/147 |
| 6,680,727 B2 | 1/2004 | Butler et al. | | 345/147 |
| 6,680,902 B1 | 1/2004 | Hudson | | 370/210 |
| 6,683,924 B1 | 1/2004 | Ottosson et al. | | 375/343 |
| 6,687,723 B1 | 2/2004 | Ding | | 708/322 |
| 6,690,723 B1 | 2/2004 | Gose et al. | | 375/233 |
| 6,714,585 B1 | 3/2004 | Wang et al. | | 375/148 |
| 6,724,809 B2 | 4/2004 | Reznik | | 375/148 |
| 6,741,634 B1 | 5/2004 | Kim et al. | | 375/144 |

| | | | |
|---|---|---|---|
| 6,754,340 B1 | 6/2004 | Ding | 379/406.08 |
| 6,798,737 B1 | 9/2004 | Dabak et al. | 370/209 |
| 6,801,565 B1 | 10/2004 | Bottomley et al. | 375/148 |
| 6,816,541 B1 | 11/2004 | Schmidl | 375/148 |
| 6,839,390 B2 | 1/2005 | Mills | 375/341 |
| 6,850,772 B2 | 2/2005 | Mottier | 455/526 |
| 6,909,742 B1 | 6/2005 | Leonosky | 375/232 |
| 6,931,052 B2 | 8/2005 | Fuller et al. | 375/144 |
| 6,947,481 B1 | 9/2005 | Citta et al. | 375/232 |
| 6,947,506 B2 | 9/2005 | Mills | 375/346 |
| 6,956,893 B2 | 10/2005 | Frank et al. | 375/147 |
| 6,959,065 B2 | 10/2005 | Sparrman et al. | 376/349 |
| 6,963,546 B2 | 11/2005 | Misra et al. | 370/294 |
| 6,975,669 B2 | 12/2005 | Ling et al. | 375/141 |
| 6,975,670 B1 | 12/2005 | Aldaz et al. | 375/144 |
| 6,975,671 B2 | 12/2005 | Sindhushayana et al. | 375/144 |
| 6,986,096 B2 | 1/2006 | Chaudhuri et al. | 714/780 |
| 6,993,070 B1 | 1/2006 | Berthet et al. | 675/232 |
| 6,996,385 B2 | 2/2006 | Messier et al. | 455/226.3 |
| 7,020,175 B2 | 3/2006 | Frank | 375/130 |
| 7,035,316 B2 | 4/2006 | Smee et al. | 375/147 |
| 7,035,354 B2 | 4/2006 | Karnin et al. | 375/341 |
| 7,042,929 B2 | 5/2006 | Pan et al. | 375/148 |
| 7,054,354 B2 | 5/2006 | Gorokhov et al. | 375/148 |
| 7,092,464 B2 | 8/2006 | Mills | 375/346 |
| 7,099,377 B2 | 8/2006 | Berens et al. | 375/148 |
| 7,103,094 B2 | 9/2006 | Lotter et al. | 375/148 |
| 7,133,435 B2 | 11/2006 | Papasakellariou et al. | 375/148 |
| 7,149,200 B1 | 12/2006 | Vadgama | 370/335 |
| 7,194,051 B2 | 3/2007 | Li et al. | 375/349 |
| 7,209,515 B2 | 4/2007 | Kilfoyle et al. | 375/152 |
| 7,286,500 B1 * | 10/2007 | Bhatoolaul et al. | 370/320 |
| 7,324,437 B1 | 1/2008 | Czylwik et al. | 370/210 |
| 7,349,379 B2 | 3/2008 | Schmidl et al. | 370/342 |
| 7,469,024 B2 | 12/2008 | Khayrallah et al. | 375/347 |
| 7,630,427 B2 * | 12/2009 | Banister et al. | 375/148 |
| 7,697,595 B2 | 4/2010 | Nagarajan | 375/148 |
| 2001/0003443 A1 | 6/2001 | Velazquez et al. | 342/367 |
| 2001/0020912 A1 | 9/2001 | Naruse et al. | 342/357.06 |
| 2001/0021646 A1 | 9/2001 | Antonucci et al. | 455/404 |
| 2001/0038665 A1 | 11/2001 | Baltersee et al. | 375/148 |
| 2001/0046266 A1 | 11/2001 | Rakib et al. | 375/259 |
| 2001/0053143 A1 | 12/2001 | Li et al. | 370/344 |
| 2002/0001299 A1 | 1/2002 | Petch et al. | 370/350 |
| 2002/0051433 A1 | 5/2002 | Affes et al. | 370/335 |
| 2002/0060999 A1 | 5/2002 | Ma et al. | 370/335 |
| 2002/0090025 A1 | 7/2002 | Kober | 375/148 |
| 2002/0131534 A1 | 9/2002 | Ariyoshi et al. | 375/346 |
| 2002/0154717 A1 | 10/2002 | Shima et al. | 375/349 |
| 2002/0172173 A1 | 11/2002 | Schilling et al. | 370/335 |
| 2002/0176488 A1 | 11/2002 | Kober | 375/147 |
| 2002/0191676 A1 | 12/2002 | Kenneth | 375/130 |
| 2002/0196767 A1 | 12/2002 | Sim | 370/342 |
| 2003/0005009 A1 | 1/2003 | Usman | 708/322 |
| 2003/0012264 A1 | 1/2003 | Papasakellariou et al. | 375/148 |
| 2003/0053526 A1 | 3/2003 | Reznik | 375/148 |
| 2003/0054814 A1 | 3/2003 | Karabinis et al. | 455/427 |
| 2003/0072277 A1 * | 4/2003 | Subrahmanya et al. | 370/320 |
| 2003/0095590 A1 | 5/2003 | Fuller et al. | 375/148 |
| 2003/0128742 A1 | 7/2003 | Johnson | 375/147 |
| 2003/0156630 A1 | 8/2003 | Sriram et al. | 375/148 |
| 2003/0202568 A1 | 10/2003 | Choi et al. | 375/148 |
| 2003/0210667 A1 | 11/2003 | Zhengdi | 370/335 |
| 2003/0219085 A1 | 11/2003 | Endres et al. | 375/350 |
| 2004/0008765 A1 | 1/2004 | Chung et al. | 375/233 |
| 2004/0013190 A1 | 1/2004 | Jayaraman et al. | 375/233 |
| 2004/0017843 A1 | 1/2004 | Fitton et al. | 375/148 |
| 2004/0076224 A1 | 4/2004 | Onggosanusi et al. | 375/144 |
| 2004/0151235 A1 | 8/2004 | Olson | 375/148 |
| 2004/0161065 A1 | 8/2004 | Buckley et al. | 375/350 |
| 2004/0190601 A1 | 9/2004 | Papadimitriou et al. | 375/148 |
| 2004/0248515 A1 | 12/2004 | Molev Shteiman | 455/63.1 |
| 2004/0264552 A1 | 12/2004 | Smee et al. | 375/147 |
| 2005/0002445 A1 | 1/2005 | Dunyak et al. | 375/148 |
| 2005/0013349 A1 | 1/2005 | Chae et al. | 375/148 |
| 2005/0031060 A1 | 2/2005 | Thomas | 375/346 |
| 2005/0084045 A1 | 4/2005 | Stewart et al. | 375/350 |
| 2005/0129107 A1 | 6/2005 | Park et al. | 375/233 |
| 2005/0180364 A1 | 8/2005 | Nagarajan | 370/335 |
| 2005/0190868 A1 | 9/2005 | Khandekar et al. | 375/346 |
| 2005/0213529 A1 | 9/2005 | Chow et al. | 370/320 |
| 2005/0223049 A1 | 10/2005 | Regis | 708/300 |
| 2005/0243908 A1 | 11/2005 | Heo et al. | 375/233 |
| 2005/0259770 A1 | 11/2005 | Chen | 348/346 |
| 2005/0270991 A1 | 12/2005 | Pan et al. | 370/280 |
| 2006/0007895 A1 | 1/2006 | Coralli et al. | 370/335 |
| 2006/0013289 A1 | 1/2006 | Hwang | 375/148 |
| 2006/0047842 A1 | 3/2006 | McElwain | 709/231 |
| 2006/0078042 A1 | 4/2006 | Lee et al. | 375/148 |
| 2006/0126703 A1 | 6/2006 | Karna | 375/147 |
| 2006/0141933 A1 | 6/2006 | Smee et al. | 455/63.1 |
| 2006/0141934 A1 | 6/2006 | Pfister et al. | 455/63.1 |
| 2006/0141935 A1 | 6/2006 | Hou et al. | 455/63.1 |
| 2006/0142041 A1 | 6/2006 | Tomasin et al. | 455/522 |
| 2006/0209933 A1 | 9/2006 | Pietraski et al. | 375/148 |
| 2007/0041310 A1 | 2/2007 | Tulino | 370/205 |
| 2007/0160013 A1 | 7/2007 | Schotten | 370/335 |
| 2009/0060017 A1 | 3/2009 | Zerbe | 375/229 |

FOREIGN PATENT DOCUMENTS

| | | |
|---|---|---|
| DE | 4326843 | 2/1995 |
| DE | 4343959 | 6/1995 |
| EP | 0610989 | 8/1994 |
| GB | 2280575 | 1/1995 |
| JP | 2000-13360 | 1/2000 |
| WO | WO 92/11722 | 7/1992 |
| WO | WO 93/12590 | 6/1993 |
| WO | WO 98/08319 | 2/1998 |
| WO | WO 00/44106 | 7/2000 |
| WO | WO 03/043239 | 5/2003 |
| WO | WO 03-060546 | 7/2003 |

OTHER PUBLICATIONS

EP Office Action with mail date of Sep. 8, 2009 re EP Application No. 03770434. 3 Pages.

EP Office Action with mail date of Nov. 30, 2009 re EP Application No. 02776047.9. 4 pages.

EP Office Action with mail date of Jun. 27, 2006 re EP Application No. 02776047.9. 6 Pages.

Scharf et al., "Matched Subspace Detectors, Signals Systems and Computers," 1993 Conference Record of the twenty-seventh Asilomar Conference on Pacific Grove, CA, USA, Nov. 1-3, 1993, Los Alamitos, CA, USA, IEEE Computer Soc., pp. 701-706. 6 pages.

Scharf, et al., "Matched Subspace Detectors," IEEE Transactions on Signal Processing, vol. 42, No. 8, Aug. 1994. 12 pages.

Price, et al., "A Communication Technique for Multipath Channels," Proceedings of the IRE, vol. 46, The Institute of Radio Engineers, New York, NY, US, Aug. 8, 1957. 16 pages.

Schlegel, Christian, Alexander, Paul and Roy, Sumit, "Coded Asynchronous CDMA and Its Efficient Detection," IEEE Transactions on Information Theory, vol. 44, No. 7, Nov. 1998. 11 pages.

Xie, Zhenhua; Short, Robert T. and Rushforth, Craig K., "A Family of Suboptimum Detectors for Coherent Multiuser Communications," IEEE Journal on Selected Areas in Communications, vol. 8, No. 4, May 1990. 8 pages.

Viterbi, Andrew J., "Very Low Rate Convolutional Codes for Maximum Theoretical Performance of Spread-Spectrum Multiple-Access Channels," IEEE Journal on Selected Areas in Communications, vol. 8, No. 4, May 1990. 9 pages.

Verdu, Sergio, "Minimum Probability of Error for Asynchronous Gaussian Multiple-Access Channels," IEEE Transactions on Information Theory, vol. IT-32, No. 1, Jan. 1986. 12 pages.

Behrens, Richard T. and Scharf, Louis I., "Signal Processing Applications of Oblique Projection Operators," IEEE Transactions on Signal Processing, vol. 42, No. 6, Jun. 1994, pp. 1413-1424. 12 pages.

Alexander, Paul D., Rasmussen, Lars K., and Schlegel, Christian B., "A Linear Receiver for Coded Multiuser CDMA," IEEE transactions on Communications, vol. 45, No. 5, May 1997. 6 pages.

Schlegel, Christian; Roy, Sumit; Alexander, Paul D.; and Xiang, Zeng-Jun, "Multiuser Projection Receivers," IEEE Journal on Selected Areas in Communications, vol. 14, No. 8, Oct. 1996. 9 pages.

Halper, Christian; Heiss, Michael; and Brasseur, Georg, "Digital-to-Analog Conversion by Pulse-Count Modulation Methods," IEEE Transactions on Instrumentation and Measurement, vol. 45, No. 4, Aug. 1996. 10 pages.

Ortega, J.G.; Janer, C.L.; Quero, J.M.; Franquelo, L.G.; Pinilla, J.; and Serrano, J., "Analog to Digital and Digital to Analog Conversion Based on Stochastic Logic," IEEE 0-7803-3026-9/95, 1995. 5 pages.

Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP 1996, Crystal Semiconductor Corporation, pp. 59-63. 5 pages.

Schlegel, C.B.; Xiang, Z-J.; and Roy, S., "Projection Receiver: A New Efficient Multi-User Detector," IEEE 0-7803-2509-5/95, 1995. 5 pages.

Affes, Sofiene; Hansen, Henrik; and Mermelstein, Paul, "Interference Subspace Rejection: A Framework for Multiuser Detection in Wideband CDMA," IEEE Journal on Selected Areas in Communications, vol. 20, No. 2, Feb. 2002. 16 pages.

Schneider, Kenneth S., "Optimum Detection of Code Division Multiplexed Signals," IEEE Transactions on Aerospace and Electronic Systems, vol. AES-15, No. 1, Jan. 1979. 5 pages.

Mitra, Urbashi, and Poor, H. Vincent, "Adaptive Receiver Algorithms for Near-Far Resistant CDMA," IEEE Transactions on Communications, vol. 43, No. 2/3/4, Feb./Mar./Apr. 1995. 12 pages.

Lupas, Ruxandra and Verdu, Sergio, "Near-Far Resistance of Multiuser Detectors in Asynchronous Channels," IEEE transactions on Communications, vol. 38, No. 4, Apr. 1990. 13 pages.

Lupas, Ruxandra and Verdu, Sergio, "Linear Multiuser Detectors for Synchronous Code-Division Multiple-Access Channels," IEEE Transactions on Information Theory, vol. 35, No. 1, Jan. 1989. 14 pages.

Cheng, Unjeng, Hurd, William J., and Statman, Joseph I., "Spread-Spectrum Code Acquisition in the Presence of Doppler Shift and Data Modulation," IEEE Transactions on Communications, vol. 38, No. 2, Feb. 1990. 10 pages.

Behrens, Richard T. and Scharf, Louis L., "Parameter Estimation in the Presence of Low Rank Noise," 22ACSSC-12/88/0341, pp. 341-344, Maple Press, 1988. 4 pages.

Iltis, Ronald A. and Mailaender, Laurence, "Multiuser Detection of Quasisynchronous CDMA Signals Using Linear Decorrelators," IEEE Transactions on Communications, vol. 44, No. 11, Nov. 1996. 11 pages.

Mitra, Urbashi and Poor, H. Vincent, "Adaptive Decorrelating Detectors for CDMA Systems," accepted for Wireless Communications Journal, accepted May 1995. 25 pages.

EP Office Communication pursuant to Article 94(3) EPC, First Examination Report, dated Jul. 4, 2008, in EP Application No. 03770434.3-1525. 7 pages.

EP Office Communication pursuant to Article 94(3) EPC, Second Examination Report, dated Jan. 13, 2009 in EP Application No. 03770434.3-1525. 4 pages.

Guo et al., "Linear Parallel Interference Cancellation in Long-Code CDMA," IEEE Journal on Selected Areas in Communications, Dec. 1999, pp. 2074-2081, vol. 17, No. 12. 8 pages.

Guo, et al., "MMSE-Based Linear Parallel Interference Cancellation in CDMA," IEEE Proceedings, 0-7803-4281-X/97, Sep. 1998, pp. 917-921. 5 pages.

Rasmussen, et al., "Convergence Behaviour of Linear Parallel Cancellation in CDMA," IEEE Global Telecom. Conf. (San Antonio, Texas), Dec. 2001, pp. 3148-3152. 5 pages.

Guo, et al., "A Matrix-Algebraic Approach to Linear Parallel Interference Cancellation in CDMA," IEEE Transactions on Communications, Jan. 2000, pp. 152-161, vol. 48, No. 1. 10 pages.

Rasmussen, et al., "Ping-Pong Effects in Linear Parallel Interference Cancellation for CDMA," IEEE Transactions on Wireless Communications, Mar. 2003, pp. 357-363, vol. 2, No. 2. 7 pages.

Lin, et al., "Iterative Multiuser Decoding with Maximal Ratio Combining," Australian Workshop on Communication Theory, (Newcastle, Australia), Feb. 2004, pp. 42-46. 5 pages.

Lin, et al., "Truncated Maximal Ratio Combining for Iterative Multiuser Decoding," Australian Workshop on Communication Theory, (Brisbane, Australia), Feb. 2005. 6 pages.

Wang, et al., "Iterative (Turbo) Soft Interference Cancellation and Decoding for Coded CDMA," IEEE Transactions on Communications, Jul. 1999, pp. 1046-1061, vol. 47, No. 7. 16 pages.

Divsalar, et al., "Improved Parallel Interference Cancellation for CDMA," IEEE Transactions on Communications, Feb. 1998, pp. 258-268, vol. 46., No. 2. 11 pages.

Ali-Hackl, et al., "Error Vector Magnitude as a Figure of Merit for CDMA Receiver Design," The 5th European Wireless Conference, Feb. 2004. 7 pages.

Xue, et al., "Adaptive Multistage Parallel Interference Cancellation for CDMA," IEEE Journal on Selected Areas in Communications, Oct. 1999, vol. 17, No. 10. 13 pages.

Hooli et al., "Chip-Level Channel Equalization in WCDMA Downlink," EURASIP Journal on Applied Signal Processing 2002:8, pp. 757-770, Mar. 7, 2002. 14 pages.

Rasmussen, et al., "A Matrix-Algebraic Approach to Successive Interference Cancellation in CDMA," IEEE Transactions on Communications, Jan. 2000, vol. 48, No. 1, pp. 145-151. 7 pages.

Tan, et al., "Linear Interference Cancellation in CDMA Based on Iterative Techniques for Linear Equation Systems," IEEE Transactions on Communications, Dec. 2000, vol. 48, No. 12, pp. 2099-2108. 10 pages.

Yener, et al., "CDMA Multiuser Detection: A Nonlinear Programming Approach," IEEE Transactions on Communications, Jun. 2002, vol. 50, No. 6, pp. 1016-1024. 9 pages.

Persson, et al., "Time-Frequency Localized CDMA for Downlink Multi-Carrier Systems," IEEE 7th Int. Symp. on Spread-Spectrum Tech. & Appl., Sep. 2-5, 2002, vol. 1, pp. 118-122. 5 pages.

Ping, et al., "Decision-Feedback Blind Adaptive Multiuser Detector for Synchronous CDMA System," IEEE Transactions on Vehicular Technology, Jan. 2000, vol. 49, No. 1, pp. 159-166. 8 pages.

Dai, et al., "Iterative Space-Time Processing for Multiuser Detection in Multipath CDMA Channels," IEEE Transactions on Signal Processing, Sep. 2002, vol. 50, No. 6, pp. 2116-2127. 12 pages.

Guo, Yuanbin, "Advanced MIMO-CDMA Receiver for Interference Suppression: Algorithms, System-on-Chip Architectures and Design Methodology," PhD Thesis, Rice University, May 2005, pp. 165-186. 27 pages.

Naidu, Prabhakar S., "Modern Digital Signal Processing: An Introduction," Alpha Science International Ltd., UK, Copyright 2003, pp. 124-126. 6 pages.

Frankel et al., "High-performance photonic analogue-digital converter," Electronic Letters, Dec. 4, 1997, vol. 33, No. 25, pp. 2096-2097. 2 pages.

Stimson, George W., "An Introduction to Airborne Radar," 2nd Edition, SciTech Publishing Inc., Mendham, NJ, 1998, pp. 163-176 and 473-491. 40 pages.

Kaplan, Elliott D., Editor, "Understanding GPS—Principles and Applications," Artech House, Norwood MA, 1996, pp. 152-236. (Provided publication missing pp. 83-151 of cited reference.) 46 pages.

Rappaport, Theodore S., Editor, "Wireless Communications—Principles & Practice," Prentice Hall, Upper Saddle River, NJ, 1996, pp. 518-533. 14 pages.

Best, Roland E., "Phase-Locked Loops—Design, Simulation, and Applications," 4th edition, McGraw-Hill, 1999. 23 pages.

Garg, Vijay K. and Wilkes, Joseph E., "Wireless and Personal Communications Systems," Prentice Hall PTR, Upper Saddle River, NJ, 1996. 45 pages.

Kohno, Ryuji, Imaj, Hideki, and Hatori, Mitsutoshi, "Cancellation techniques of Co-Channel Interference in Asynchronous Spread Spectrum Multiple Access Systems," May 1983, vol. J 56-A, No. 5. 8 pages.

Thomas, John K., "Thesis for the Doctor of Philosophy Degree," UMI Dissertation Services, Jun. 28, 1996. 117 pages (Title: Canonical Correlations and Adaptive Subspace Filtering).

Viterbi, Andrew J., "CDMA—Principles of Spread Spectrum Communication," Addison-Wesley Publishing Company, Reading, MA, 1995, pp. 11-75 and 179-233. 66 pages.

Behrens, Richard T., "Subspace Signal Processing in Structured Noise," UMI Dissertation Services, Ann Arbor, MI, Nov. 30, 1990. 166 pages.

Scharf, Louis L., "Statistical Signal Processing—Detection, Estimation, and Time Series Analysis," Addison-Wesley Publishing Company, 1991, pp. 23-75 and 103-178. 74 pages.

Non-Final Office Action, with mail date of Jun. 25, 2010, re U.S. Appl. No. 11/893,707. 9 pages.

Proakis, John G., "Digital Communications," McGraw-Hill, 4th edition, 2000, pp. 622-626, 956-959. 10 pages.

Verdu, Sergio, "Multiuser Detection," Cambridge University Press, New York, NY, 1998, pp. 291-306. 18 pages.

Kim, et al., "Adaptive Weighted Parallel Interference Cancellation for CDMA Systems," Electronic Letters, Oct. 29, 1998, V34, No. 22. 2 pages.

Response dated Sep. 28, 2010 to the Non-Final Office Action mailed Jun. 25, 2009 re U.S. Appl. No. 11/893,707, includes Petition for Extension of Time. 17 pages.

Response dated Nov. 30, 2010 to Notice of Incomplete Reply of Nov. 16, 2010 re U.S. Appl. No. 12/916,439. 16 Pages.

Response dated Nov. 30, 2010 to Notice of Incomplete Reply of Nov. 15, 2010 re U.S. Appl. No. 12/916,467. 16 Pages.

Response dated Dec. 8, 2010 to the Notice to File Missing Parts mailed Dec. 3, 2010 re U.S. Appl. No. 12/948,749. 20 Pages.

Notice of Allowance and Fee(s) Due with mail date of Jan. 6, 2011 re U.S. Appl. No. 11/893,707. 12 Pages.

Response dated Mar. 21, 2011 to the Notice of Allowance mailed on Jan. 6, 2011 re U.S. Appl. No. 11/893,707 includes Request for Continued Examination. 16 Pages.

Notice of allowance and Fee(s) Due with mail date of Mar. 31, 2011 re U.S. Appl. No. 11/893,707. 26 Pages.

Response dated Apr. 14, 2011 to the Office Action mailed Feb. 14, 2011 re U.S. Appl. No. 12/916,467. 16 Pages.

Non-Final Office Action dated Mar. 26, 2008 for U.S. Appl. No. 11/003,881 dated Dec. 3, 2004. 25 pages.

Non-Final Office Action dated Sep. 11, 2008 for U.S. Appl. No. 11/003,881 dated Dec. 3, 2004. 25 pages.

Non-Final Office Action dated Dec. 19, 2008 for U.S. Appl. No. 11/003,881 dated Dec. 3, 2004. 6 pages.

Office Action dated May 4, 2011 re U.S. Appl. No. 12/948,749. 17 Pages.

Notice of Allowance and Fee(s) Due dated Jun. 27, 2011 re U.S. Appl. No. 12/916,467. 24 Pages.

Non-Final Office Action dated Feb. 14, 2011 for U.S. Appl. No. 12/916,467 filed Oct. 29, 2010. 13 pages.

Request for Continued Examination dated Aug. 9, 2011 re U.S. Appl. No. 12/916,467. 4 Pages.

* cited by examiner

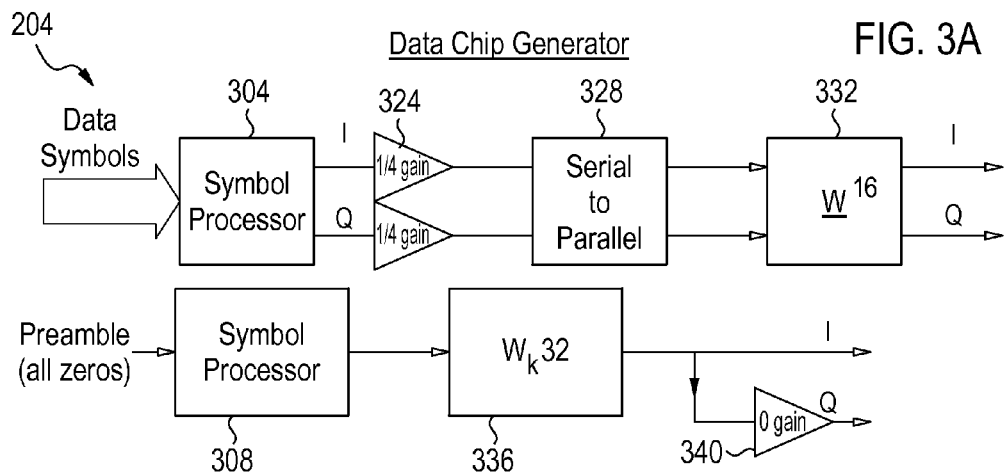
FIG. 3A
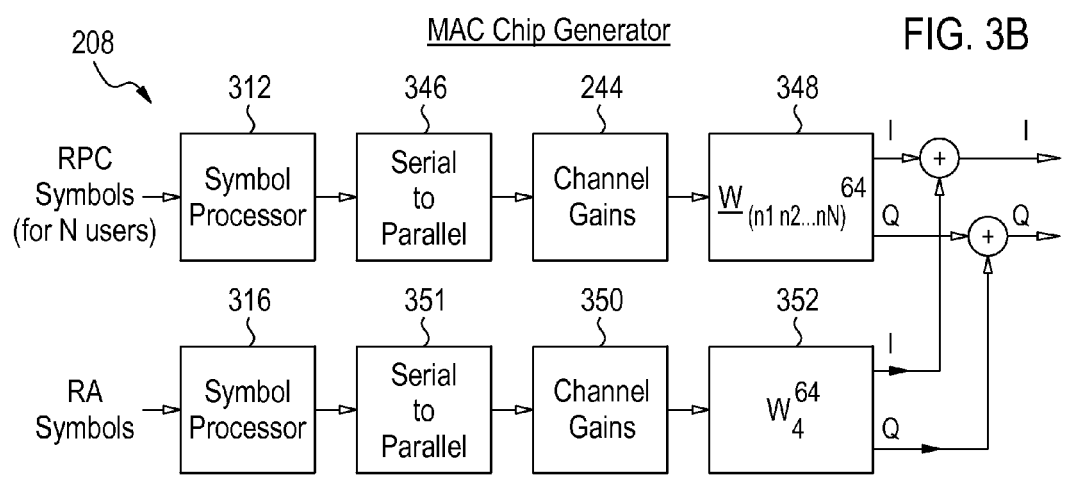
FIG. 3B
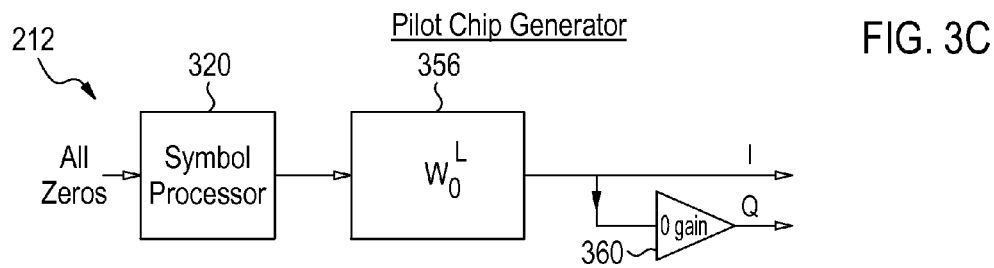
FIG. 3C
FIG. 3
(Prior Art)

METHODS FOR ESTIMATION AND INTERFERENCE SUPPRESSION FOR SIGNAL PROCESSING

CROSS-REFERENCE TO RELATED APPLICATIONS

This application is a continuation of U.S. patent application Ser. No. 11/893,707, entitled "Methods for Estimation and Interference Cancellation for signal processing," and filed Aug. 17, 2007; which (1) claims priority to U.S. Patent Application No. 60/838,262, entitled "Technique for estimating user and background noise powers in a code division multiple access system without signaling assistance and application of such to channel quality measurement with a linear receiver," and filed on Aug. 17, 2006; (2) is a continuation-in-part of U.S. patent application Ser. No. 11/452,027, entitled "Iterative Interference Cancellation Using Mixed Feedback Weights and Stabilizing Step Sizes," and filed Jun. 13, 2006, now U.S. Pat. No. 7,715,508; (3) is a continuation-in-part of U.S. patent application Ser. No. 11/432,580, entitled "Interference Cancellation in Variable Codelength Systems for Multi-Access Communication," and filed May 11, 2006, now U.S. Pat. No. 7,697,595; (4) is a continuation-in-part of U.S. patent application Ser. No. 11/003,881, entitled "Systems and methods for serial cancellation," and filed on Dec. 3, 2004, and published as U.S. Patent Application Publication Number 2005-0123080 A1; (5) is a continuation-in-part of U.S. patent application Ser. No. 10/686,829, entitled "Method and Apparatus for Channel Amplitude Estimation and Interference Vector Construction," and filed on Oct. 15, 2003, now U.S. Pat. No. 7,580,448, which claims priority to U.S. Patent Application No. 60/418,187, entitled "Method for channel amplitude estimation and interference vector construction," and filed Oct. 15, 2002; and (6) is a continuation-in-part of U.S. patent application Ser. No. 10/669,954, entitled "Method and Apparatus for Selectively Applying Interference Cancellation in Spread Spectrum Systems," and filed on Sep. 23, 2003, now U.S. Pat. No. 7,787,518, which claims priority to U.S. Patent Application No. 60/412,550, entitled "Controller for interference cancellation in spread spectrum systems," and filed Sep. 23, 2002. The entirety of each of the foregoing patents, patent applications, and patent application publications is incorporated by reference herein.

BACKGROUND

1. Field of the Invention

The invention generally relates to the field of signal processing. More specifically the invention is related to estimating powers of user subchannels and interference for the purpose of interference cancellation and error decoding.

2. Discussion of the Related Art

With the advent of new CDMA standards for Data transmission, there has been an ever-growing demand for higher data rates. However, interference degrades signal detection, tracking, and demodulation capabilities of a CDMA receiver by impeding the recovery of a signal of interest. Interference can occur when one or more unwanted signals are received simultaneously with a signal of interest. The interfering signals increase the total energy of the received signal, but decrease the Signal to Noise Ratio (SNR) of the signal of interest. Examples of such interference include multiple-access interference (MAI) and inter-symbol interference (ISI).

ISI can occur in a dispersive (e.g., multipath) environment when a transmitted signal propagates over multiple signal paths to produce an interfering signal path and a selected signal path that differentially arrive at a receiver, thereby hindering processing of the selected signal path. MAI may include interference caused by signal paths emanating from other transmitters, thereby hindering the processing of a signal from a desired transmitter. Although CDMA employs orthogonal multiple-access spreading (e.g., covering) codes to broadcast different messages to different users, multipath delay can disrupt the orthogonality between different coded subchannels. Thus, a receiver may employ interference cancellation to extract a message intended for it from a linear combination of coded signals.

Prior-art interference-cancellation techniques employ symbol estimates for data modulated on coded subchannels for synthesizing an estimated interference signal. For example, symbol estimation is performed on a per-finger basis prior to S-matrix (i.e., interference matrix) generation, which is also known as "SMG." The estimated interference signal is cancelled from the received signal to produce an interference-cancelled signal.

In prior-art error decoding, the assumption usually made is that the noise and interference power is the same across all subchannels, and the quality of the symbol estimates therefore assumes that the noise observed on the pilot is the same as that for a subchannel of interest.

SUMMARY OF THE INVENTION

In view of the foregoing background, embodiments of the present invention may provide for symbol estimation and symbol quality estimation (S Matrix generation or SMG) in an interference-cancellation system. A symbol estimation unit uses a combined signal from multiple fingers (which are assigned to different multipaths) to produce symbol estimates. Combining signals from the fingers provides diversity advantages that can improve symbol estimates for the interfering paths. An alternative embodiment of SMG may use a linear or non-linear equalizer at the front end. The symbol estimates are then refined to produce symbol quality estimates. An interference vector may be constructed by combining the symbol estimates, and the symbol quality estimates, along with other signals present in the receiver.

In one receiver embodiment, the symbol quality estimates are weights per subchannel that are applied to the symbol estimates.

Active fingers assigned to multipaths of a particular sector may be processed via a first SMG module. In one embodiment, a threshold detector may process signals from the active fingers to determine if each finger signal is strong enough to increase the reliability of the symbol estimates. The thresholds may employ pilot-strength estimates and/or noise-strength estimates as metrics. Other active fingers assigned to multipaths from other sectors in soft/softer handoff may be assigned to another SMG module. Additional fingers may be provided to track paths from other sectors that may be strong enough to cause interference, but which are not used for transmitting data to the receiver.

In some receiver embodiments, dedicated finger hardware is not used. Rather, offline fingers running faster than real-time are used. Thus, the term "finger" is intended to refer to Rake-finger function, and not necessarily the Rake finger structure. The term "finger" in an equalizer context refers to the functionality of resolving the timing of individual paths, since the equalizer may use a different form of combining (from the Rake) of the different rays.

For systems employing time-multiplexed pilots, embodiments of the invention may provide for additional hardware to generate PN-sequence information, time-tracking information, and information pertaining to chip-enables and symbol boundaries needed to perform interference cancellation for paths in which time tracking is not being performed. An EVDO receiver embodiment may process paths from sectors that are part of the active set, but not the current serving sector for the receiver. A CDMA2000 receiver embodiment may process interfering paths from sectors that are either not part of the active set or are part of the active set, but not currently assigned to a finger.

In one receiver embodiment, a control unit may be configured for switching off a canceller at predetermined times, such as for improving power efficiency in the receiver. In some embodiments, the canceller may be configured to perform iterative interference cancellation to further improve the signal quality.

In one receiver embodiment, user powers and background noise power are estimated using the front-end processor, and an estimation module that uses the Rake or equalizer output powers.

Embodiments of the invention may be employed in any receiver configured to operate with existing CDMA standards, such as IS-2000, IS-856 EV-DO (Evolution-Data Optimized), IS 95A/B, S-DMB, and the 3GPP standards such as WCDMA and HSPA.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or a discrete hardware unit.

These and other embodiments of the invention are described with respect to the figures and the following description of the preferred embodiments.

BRIEF DESCRIPTION OF THE DRAWINGS

Embodiments according to the present invention are understood with reference to the following figures:

FIG. 3A illustrates details of the Data Chip Generator shown in FIG. 2.

FIG. 3B illustrates details of the Mac Chip Generator shown in FIG. 2.

FIG. 3C illustrates details of the Pilot Chip Generator shown in FIG. 2.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
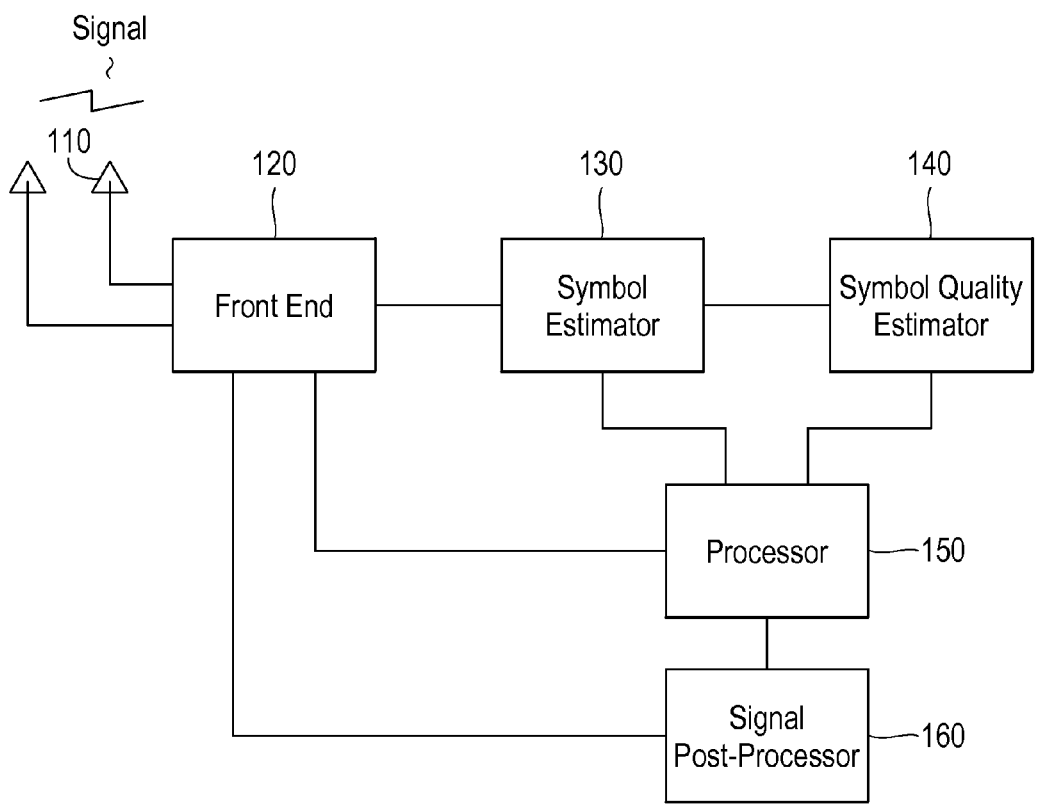
FIG. 1 shows an embodiment of the invention consisting of a front-end, a symbol estimator, and a symbol quality estimator coupled with a post-processor.

FIG. 1 shows an embodiment of the invention. The front end processor 120 receives a signal from one or more antennae (two are shown in the figure, as an example), using an RF front end 110, which performs operations such as down conversion, A/D conversion (not shown), and then the front end resolves the signal into the constituent multipaths from various sources such as base stations. As is understood in the art, a single stream of received baseband data may be composed of multiple constituent signals all arriving from different sources, and within each source, typically composed of rays arriving at different times. This resolution may use a searcher finger and finger management, which is well known in the art. The front end processor may also include functionality to select which subset of the sectors and paths it is receiving should be used for the purposes of generating symbol estimates. More details about how the front-end processor may perform this function are described in U.S. patent application Ser. No. 10/669,954, entitled "Method and apparatus for selectively applying interference cancellation in spread spectrum systems," and filed on Sep. 23, 2003, now U.S. Pat. No. 7,787,518, the entire contents of which are hereby incorporated by reference. The front-end also applies the appropriate receive filter, and typically performs a dispreading operation using the codes of the source signal being assigned to the symbol estimator. The front-end processor creates a single stream of data per transmitting source that can then be used to recover symbol estimates for that source.

A symbol estimator module 130 operates on the signals and sectors thus resolved and generates symbol estimates for multiple user subchannels that are part of the transmission. The estimation may use either a Rake like structure where multipaths are "raked" together to generate a single stream of data per transmitting source, or an equalizer such as a linear LMMSE equalizer or a non linear equalizer such as a Decision feedback equalizer. Estimation usually involves performing operations that would be performed in normal demodulation operations, but extended to multiple sources and subchannels, for the purposes of this invention. For example, in an HSDPA system or DO system, operations such as despreading and decovering may normally only be performed for the active sector, but for the purposes of interference cancellation, may be performed on all sectors and signals considered 'strong'. Estimation for CDMA may be performed using a Fast Walsh transform (sometimes referred to as a Fast Hadamard Transform) in order to efficiently produce multiple symbol estimates, while estimation for OFDM systems may be performed using a FFT (Fast Fourier Transform). Symbol estimates are then refined in a subsequent symbol quality estimator module 140 where the raw symbol estimates undergo further processing to generate signal metrics for multiple user subchannels. Such a step of refinement is needed since the raw symbol estimates are often colored by the noise and interference that are inherent in the symbol estimates. Such refinement may include filtering the symbol estimates, thresholding, weighting, debiasing of the estimates, and performing soft, hard or mixed decisions, or some combination of these operations. Some of the steps of refinement may take into account information about the standard (such as all traffic subchannels in an EV-DO transmission being transmitted at the same amplitude, OVSF codes in an HSDPA transmission being of the same amplitude) or information available to the receiver through signaling about user subchannels that may or may not be present in the signal. After refinement, the signal metrics generated by the symbol quality estimator are combined with the symbol estimates in a processor 150 and then used in a signal post-processor 160 to help recover the information in a desired subchannel. Such processing may include interference cancellation in order to mitigate interference, the generation of channel quality information (CQI) for providing feedback to a transmitter about the quality of the received data, or decoding processes that perform error decoding using the symbol estimates and the signal quality metric thus generated.

This invention will be now be further described in the context of the EV-DO standard.

Figure 2:
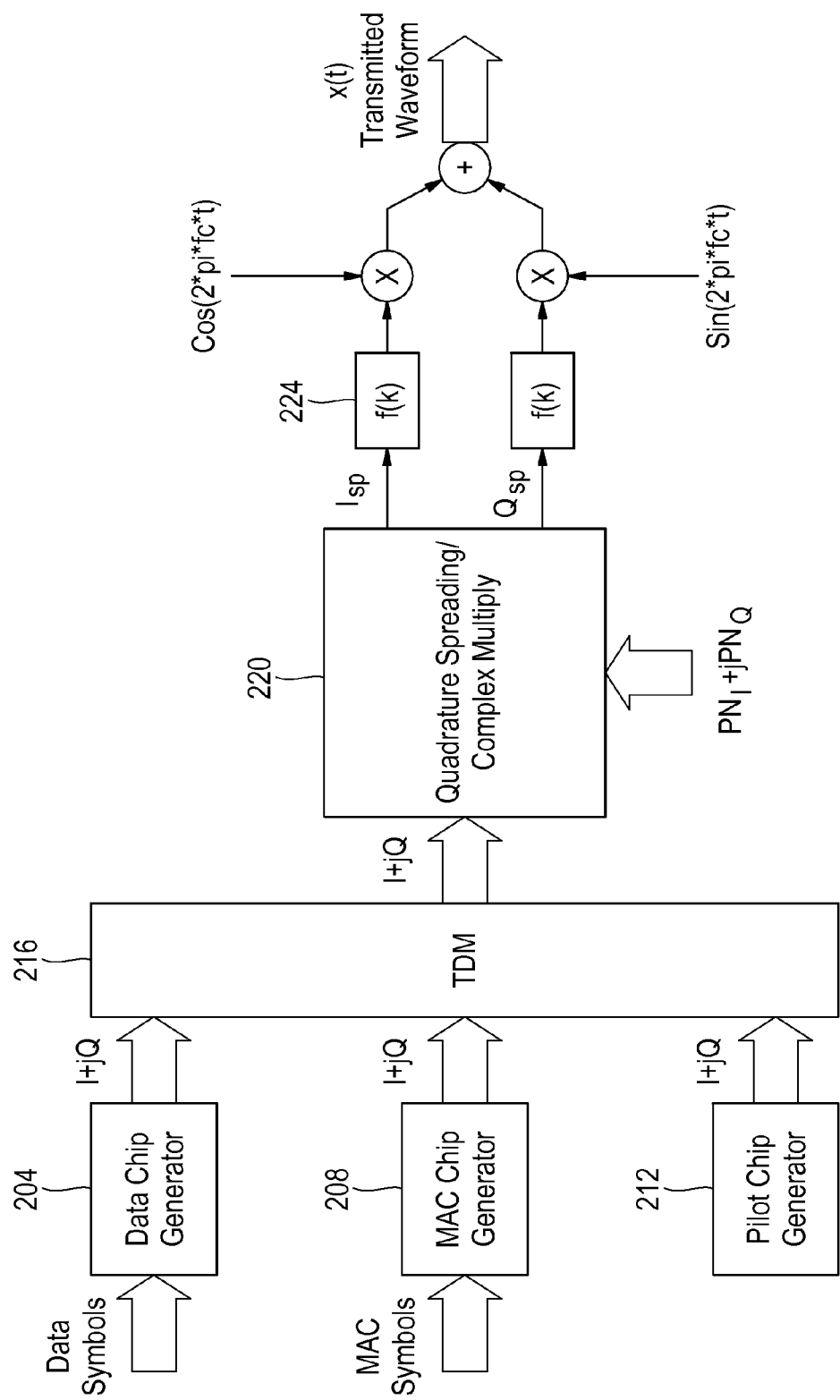
FIG. 2 is a general schematic illustrating an EV-DO transmitter.

FIG. 2 is a general schematic of an EV-DO transmitter. Data symbols are input to a Data Chip Generator 204, which generates I and Q data chips at 1.2288 Mcps. Similarly, Mac Chip Generator 208 generates MAC chips, and Pilot Chip Generator 212 generates pilot chips. A Time Division Multiplex (TDM) block 216 multiplexes the data, MAC, and pilot chips according to the slot specification in IS-856 standard to produce multiplexed data. Different channels are transmitted on a TDM slot basis with data chips taking the major portion of any time slot. Each slot is 2048 chips long with two pilot chip bursts in the middle of each half slot. If there is no data for transmission, an idle slot format having pilot bits, but containing no data, is used. A Quadrature Spreading block 220 performs a complex multiplication of the multiplexed data with a complex Pseudo Noise (PN) code. Each of the resulting spread data streams are processed by a Transmit filter f(k) 224, modulated onto carriers and transmitted.

FIG. 3A illustrates details of the Data Chip Generator 204 shown in FIG. 2. The Data Chip Generator 204 may be configured to operate in Data Mode or Preamble Mode. In Data Mode, the Data Chip Generator 204 outputs the data symbols to a Symbol Processor 304, which typically comprises an Error Control Coder (ECC), a Scrambler, a Channel Interleaver, a Modulator, and a Repetition/Puncture block (not shown). Coded data is passed through a ¼-gain block 324 to normalize power, a Serial to Parallel converter (S/P) 328, and a length-16 Walsh-covering block 332. The Walsh-covering block 332 outputs baseband Walsh-covered I and Q data chips.

In Preamble Mode, all zeros are passed through a Symbol Processor 308 that is functionally similar to the Symbol Processor 304. Symbol outputs from the Symbol Processor 308 are Walsh covered by a length-32 Walsh-covering block 336, which multiplies the symbol outputs by a $k^{th}$ row of a 32×32 Hadamard matrix, where k denotes a particular subchannel assigned to a user of interest.

FIG. 3B illustrates details of the Mac Chip Generator 208 shown in FIG. 2. Values of k are assigned using a unique MacIndex of for each user. At the time of connection setup, an Access Network (AN) assigns a particular MacIndex to each mobile. This MacIndex is unique for an access terminal's communication with a particular AN. No data symbols are transmitted on the Q channel for Preamble chips. The MAC symbols are processed by Symbol Processors 312 and 316, Serial-to-Parallel processors 346 and 351, Channel-Gain Processors 344 and 350, and length-64 Walsh-Cover blocks 348 and 352. The Walsh-Cover blocks 348 and 352 perform Walsh covering and adding to produce baseband I and Q Walsh-covered MAC chips.

FIG. 3C illustrates details of the Pilot Chip Generator 212 shown in FIG. 2. Zeros are processed by a Symbol Processor 320, followed by a Walsh-Cover block 356 configured to perform Walsh covering with an all-zeros Walsh to produce the pilot chips. Only the I channel is used for transmitting pilot chips.

Figure 4:
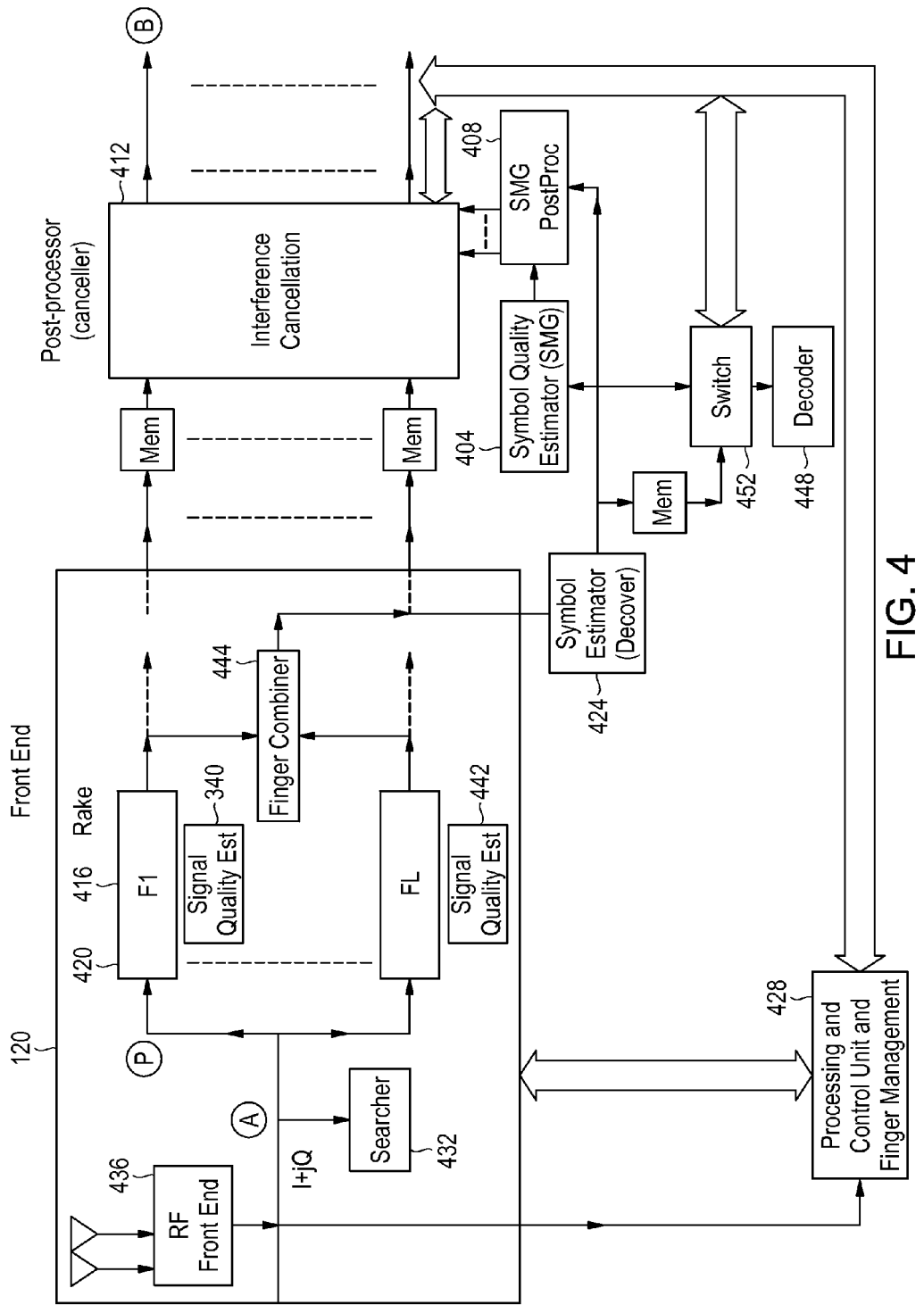
FIG. 4 illustrates a receiver in accordance with one embodiment of the invention comprising an Interference Canceller and a Rake.

FIG. 4 illustrates a receiver in accordance with one embodiment of the invention, where the post-processor comprises an Interference Canceller 412 and the front end comprises a searcher 432, an RF front end 436, and a Rake 416. An RF front end 436 (which typically comprises an AGC, an ADC, and a receive filter) processes a received signal from one or more receive antennae to produce baseband IQ data. The IQ data is provided to a searcher block 432 to identify multi paths used to update the Rake 416.

The Rake 416 illustrates details of one exemplary embodiment. The Rake module 416 comprises a set of Rake fingers 420 and a plurality of Signal Quality Estimate Blocks 440 and 442. However, other embodiments of a Rake may be used without departing from the spirit and scope of the invention. For example, a single finger may be employed for processing all of the multi paths in a Time Division Multiplexed (TDM) mode. Furthermore, different Rake embodiments may be used for estimating interference vectors. A Processing and Control Unit 428 may be employed for handling switchovers between different Rake modes, and also may perform finger management functions. Alternatively, a separate Rake module may be provided for estimation in addition to a Rake module employed for decoding.

Figure 5:
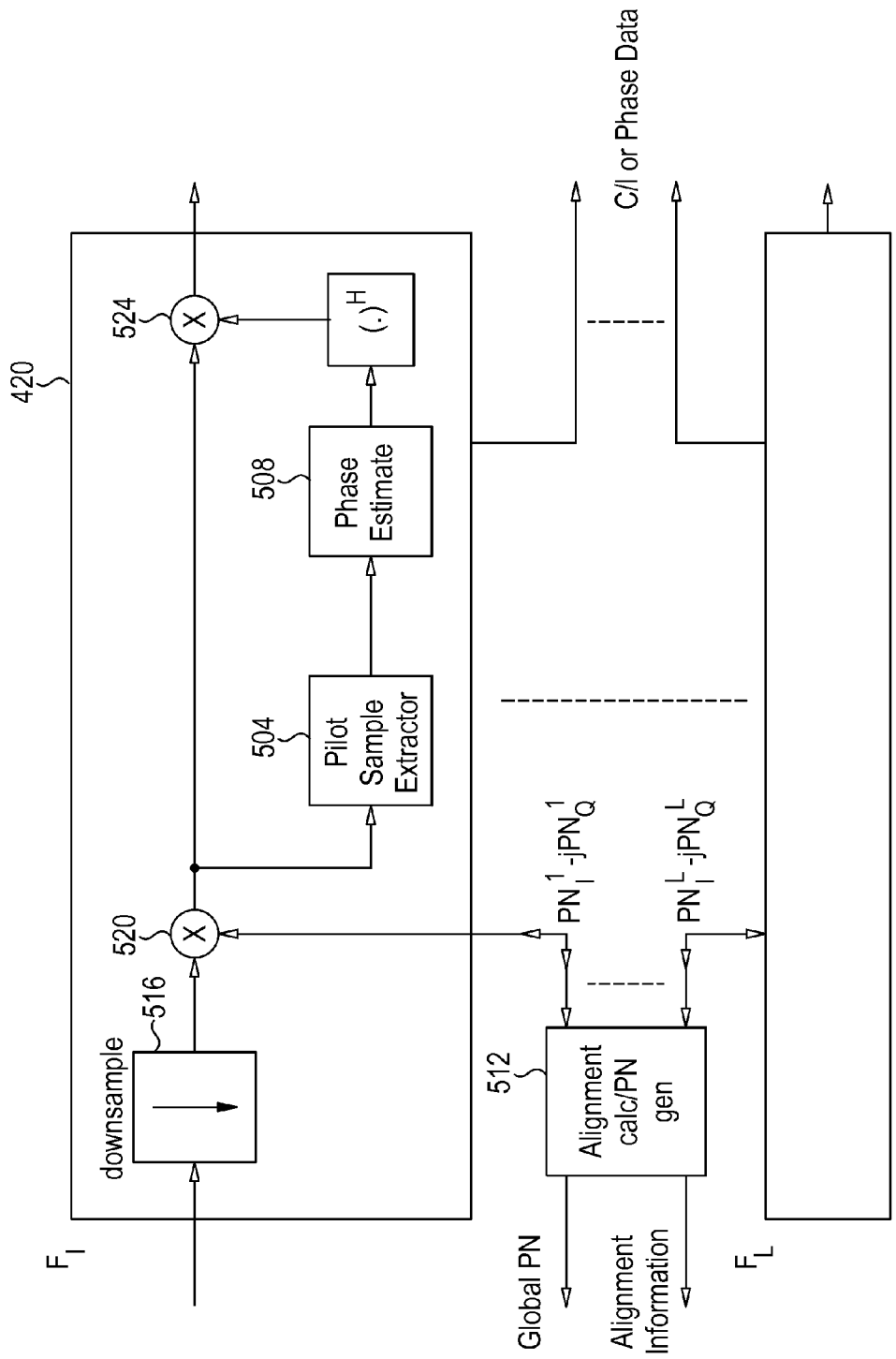
FIG. 5 illustrates an embodiment of a Rake Finger.

FIG. 5 illustrates an embodiment of the Rake Finger 420 shown in FIG. 4. Raw IQ Data is down-sampled 516 with respect to chip boundaries to extract the on-time samples and despread 520 using properly aligned PN sequences. If a single PN generator is used per finger for both Rake reception and interference cancellation, proper alignment may include masking the PN sequences forward or backward in order to account for processing latency due to interference cancellation. Alternatively, delays and buffers (not shown) may be used to maintain proper alignment of the PN sequences.

The despread data is processed by a Pilot Sample Extractor 504, which drives a Phase-Estimation block 508. Different implementations of the Phase-Estimate block 508 are well known in the art and may be incorporated herein. A phase rotator 524 rotates the despread data by the phase conjugate to mitigate effects of fading and phase errors. The phase rotator 524 may also scale the data to maximize the combined SNR. The sequence of the despreading operation and the phase rotation may also be interchanged, if that provides any architectural advantages in the specific embodiment since both are linear operations, and the order of the operations does not affect the result. In some embodiments, interference cancelled data may be used to generate the channel estimates, after performing suitable buffering.

Signals from fingers assigned to a single symbol estimator are added together at the chip level. This scheme of combining energies from different fingers from a single source is a form of Maximal ratio combining, and is well known in the art. In some embodiments, alternative scaling techniques may be used to weight each finger's data. Alternative scaling techniques may employ any combination of information about the signal, interference, noise energy present in the path tracked by each finger, and cross correlations between fingers when multiple receive antennas are employed. For example, signal quality estimators 440 and 442 shown in FIG. 4 may be employed for generating finger weights.

Alternately, an equalizer may be used to combine the plurality of signals arriving at different times, and potentially, from different antennas into a single equalized signal.

Each finger $F_1$-$F_L$ in the set of fingers 420 passes PN data to an Alignment Calculator 412 that outputs a global PN along with alignments of PN's of each finger with respect to the global PN. This calculation may be done only once for multiple iterations of interference cancellation in a given data window. The phase estimates (channel estimates) made by block 408 and corresponding blocks in each of the fingers $F_1$-$F_L$ are provided to the Canceller 412.

Each finger's $F_1$-$F_L$ output may be scaled by a scalar factor that is proportional to the corresponding finger strength before the outputs are added at the chip level. Despread (PN-stripped) data from each finger that is phase rotated and scaled is added together by a combiner 444 and processed by a decover block 424. The despreading operation may be applied after the combiner as well, in a different embodiment. If the Canceller 412 is disabled, output data from the decover block 424 is coupled directly to a switch 452. If the Canceller 412 is enabled, an output of the Canceller block for each finger is reinserted into the Rake 416 for each of the fingers $F_1$-$F_L$.

In an alternative embodiment, the Canceller 412 outputs may be routed through a control switch (not shown) that compares the signal quality (such as SNR or SINR) for each improved finger signal with corresponding quality estimates from the originally received, raw IQ data. The signal having the best SNR is routed to each of the fingers $F_1$-$F_L$. The routing decision may be made once every symbol or over a predetermined number of symbols. The decoder block 448 includes a descrambler, a de-interleaver, and a error decoder for a corresponding error control coding block in the transmitter.

Figure 6:
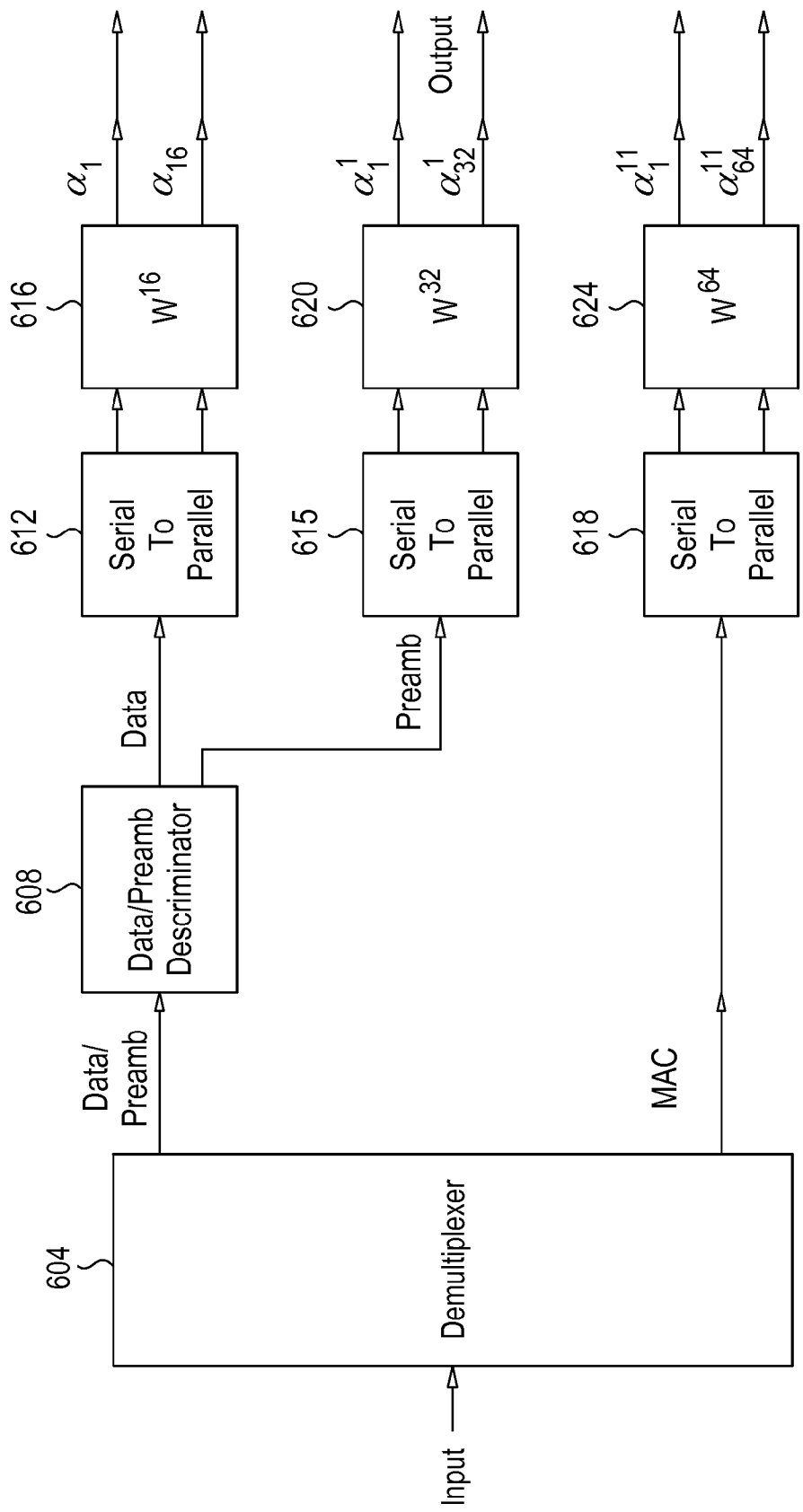
FIG. 6 is a detailed schematic of the Symbol estimator (Decover) block shown in FIG. 4.

FIG. 6 is a detailed schematic of the Symbol estimation block 424 shown in FIG. 4, which in this embodiment performs its function by decovering. PN-stripped, phase-stripped MRC data from the Rake 416 is processed by a demultiplexer 604, which separates the data/preamble chips, Mac chips, and pilot chips. The data/preamble chips are processed by a Data/Preamble Discriminator 608 to distinguish between Data and Preamble chips. Data chips are processed by a Serial to Parallel converter (S/P) 612. The symbol estimator performs its function by Walsh decovering (multiplication by the appropriate Hadamard code and summing up the chips) by a Walsh decover block 616 to produce decovered symbols $\alpha_1$ through $\alpha_{16}$. Any of the Walsh-decover blocks, such as blocks 616, 620, and 624 may be configured to perform a Fast Walsh Transform or a Fast Hadamard Transform.

Preamble chips are processed by an S/P block 615 and Walsh decovered by Walsh decover block 620 to yield $\alpha^1_1$ through $\alpha^1_{32}$. MAC chips are processed through an S/P block 618 and Walsh decovered by Walsh decover block 624 to yield $\alpha^{11}_1$ through $\alpha^{11}_{64}$. Outputs of the Decover block 424 $\alpha_1$ through $\alpha_{16}$, $\alpha^1_1$, through $\alpha^1_{32}$, and $\alpha^{11}_1$ through $\alpha^{11}_{64}$ are input to the canceller 412, which uses the decovered data in an SMG 404. Alternatively, the decovered data may be bypassed to the switch 452.

Figure 7:
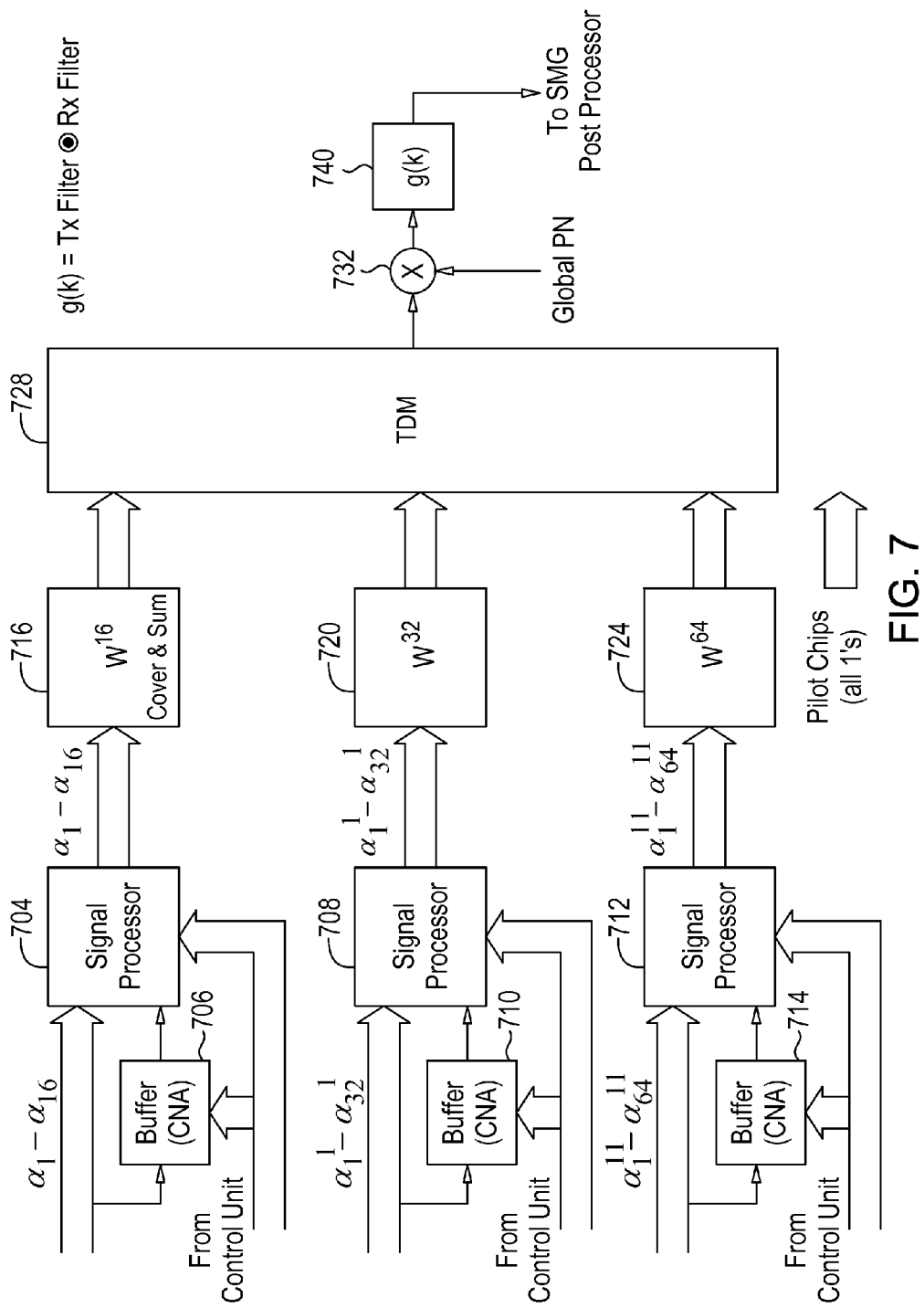
FIG. 7 illustrates one possible embodiment of the Symbol quality Estimator (SMG) shown in FIG. 4.

FIG. 7 illustrates one possible embodiment of the symbol quality estimator SMG 404 shown in FIG. 4. Walsh energies or amplitudes from the Decover block 424, either of which would represent the symbol estimates, are input into the symbol quality estimator or SMG 404, which further refines these estimates. Amplitudes $\alpha_1$ through $\alpha_{16}$ are provided to a buffer 706 whose depth may be varied by a Processing and Control Unit 428 shown in FIG. 3. The buffer 706 output is provided to a Signal Processor 704, which is configured to calculate average signal strengths in each received Walsh subchannel. This is carried out using filters that are well known in the art such as FIR filters and IIR filters. The Signal Processor 704 uses these average strengths for performing signal quality estimations. These could include generating weights, or performing soft, hard or mixed decisions. The signal processor may also select a subset of the Walsh subchannels. For example, the Signal Processor 704 may select the strongest 12 out of a total of 16 Walsh subchannels.

The signal constellation (QPSK/8PSK/16QAM, etc.) used to transmit data is typically known at the receiver. If all the constellation points have the same energy, which is the case when QPSK and 8-PSK are employed, the Signal Processor 704 may use an averaged amplitude (such as may be derived from averaged strengths or calculated using a separate filter) and sign of the current symbol's amplitude for each Walsh code in order to construct an interference vector. In some embodiments, the averaged amplitude may be derived over time and/or different Walsh codes if all the Walsh codes are known to have been transmitted with the same strength. The process of filtering the symbol estimates in each Walsh subchannel is referred to as Channel Noise Averaging (CNA).

Figure 8:
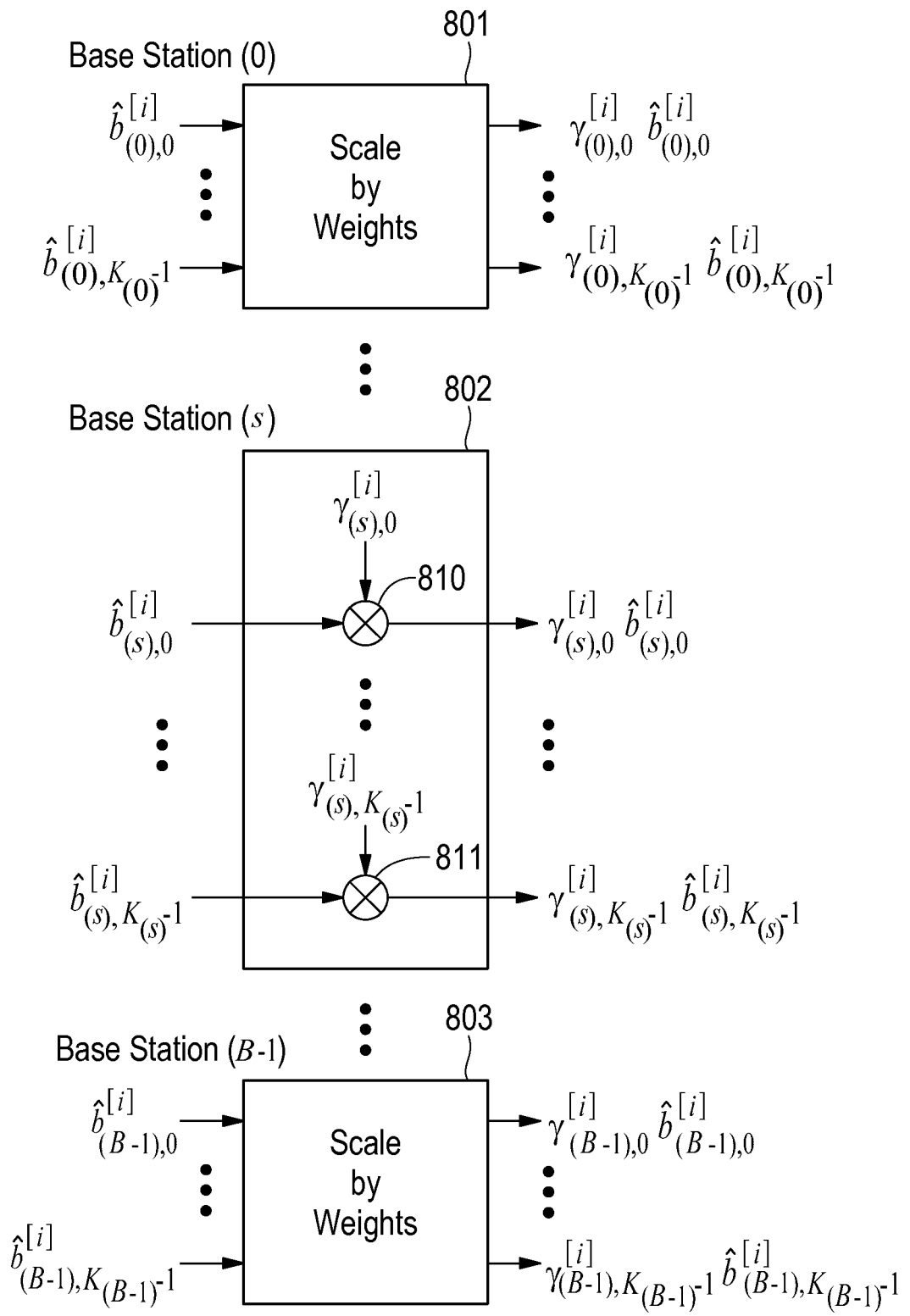
FIG. 8 illustrates the process of using weights computed using the symbol estimates to weigh the symbol estimates obtained per base station.

FIG. 8 shows a weighting module (such as weighting module 801) configured to separately process input symbol estimates corresponding to a plurality B of base stations. A plurality of scaling modules 801-803 scale the input symbol estimates. Scaling module 802 depicts detailed functionality for processing signals from an exemplary $s^{th}$ base station. Similar details are typically present in each of the scaling modules 801-803.

A plurality $K_{(s)}$ of symbol estimates $\{\hat{b}_{(s),k}^{[i]}\}_{k=0}^{K_{(s)}-1}$ of transmitted symbols $\{\hat{b}_{(s),k}^{[i]}\}_{k=0}^{K_{(s)}-1}$ produced by an $i^{th}$ symbol estimator is input to scaling module 802. The symbol estimates are multiplied 810-811 by corresponding complex weights $\{\gamma_{(s),k}^{[i]}\}_{k=0}^{K_{(s)}-1}$ to produce weighted symbol estimates $\{\gamma_{(s),k}^{[i]}\}_{k=0}^{K_{(s)}-1}$. The magnitude of weight $\gamma_{(s),k}^{[i]}$ may be calculated with respect to a merit of the corresponding symbol estimate $\hat{b}_{(s),k}^{[i]}$.

The weights may be calculated based on either the instantaneous or the filtered symbol estimates.

The soft weights can be regarded as a confidence measure related to the accuracy of a decision, or symbol estimate. For example, a high confidence weight relates to a high certainty that a corresponding decision is accurate. A low confidence weight relates to a low certainty. Since the soft weights are used to scale decisions, low-valued weights reduce possible errors that may be introduced into a calculation that relies on symbol estimates.

The weights may be a function on the amplitude or power of the symbol estimates, or may be a function of its SINR (Signal to Interference Plus Noise ratio). The SINR (and thus, the soft weights) may be evaluated using techniques of statistical signal processing, including techniques based on an error-vector magnitude (EVM). An estimation of the noise floor may be performed. Alternatively, a pilot-assisted estimate of the broadband interference-plus-noise floor, together with a user specific estimate of the signal-plus-interference-plus-noise floor, may be used to estimate the SINR values.

In iterative systems, there is an additional parameter to as to which set of symbol estimates are to be used for performing symbol quality estimation. In one embodiment, the symbol estimates from the latest iteration are used. In another embodiment, weights are generated for all iterations, and the weights from the set of weights yielding the highest SINR are used for weighing the symbol estimates. In yet another embodiment, a combination of the weights is used, such as an average of the weights across the iterations.

The Signal Processor 704 outputs values $a_1$ through $a_{16}$, which are respective Walsh weights used in Cover and Sum block 716. For example, if an idle slot is detected, the Signal Processor 704 may process $\alpha_1$ through $\alpha_{16}$ and set $a_1$ through $a_{16}$ to zero at the output if no Walsh channels are present during idle slot. A length-16 Walsh cover is multiplied by each of the values $a_1$ through $a_{16}$ and added chip by chip at the Cover and Sum block 716.

A Preamble Signal Processor 708 and a covering block 720 are configured for processing preamble Walsh signals to produce preamble chips. Similarly, a MAC Signal Processor 712 and a covering block 720 are configured for processing MAC Walsh energies to generate MAC chips. A Time Division Multiplexer (TDM) 728 multiplexes pilot chips and chips produced by the covering blocks 716, 720, and 724 according to the slot format specified in IS-856. The TDM's 728 output is multiplied by a global PN from the Alignment Calculator block 512 and provided to the filter g(k) 740, which is a convolution of the transmit and receive filter. The filter 740 output may be provided to the SMG post processor 408.

In another embodiment, the estimation of the symbol quality and specifically, the noise and user powers may be made without the simplifying assumptions made in the previous section.

Figure 9:
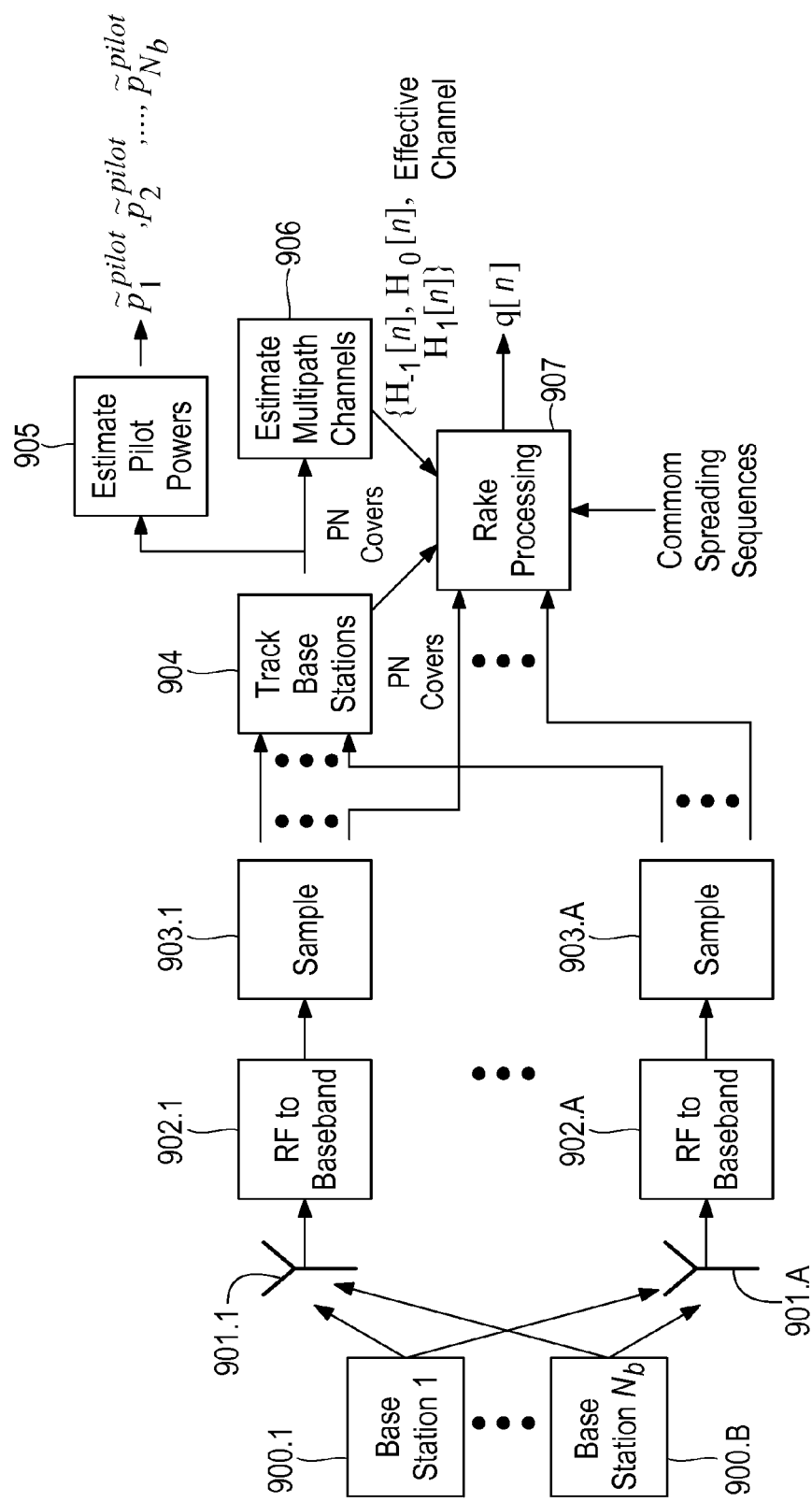
FIG. 9 is a schematic of the front end showing the operations needed to generate estimates of noise and interference.

FIG. 9 outlines initial processing of the received signal. The following formula represents a received CDMA signal on antenna a (of a possible multiplicity of antennas 901.1-901.A) that has been converted from radio frequency (RF) to baseband 902.1-902.A and then sampled during the n-th symbol interval to form a vector 903.1-903.A; it includes transmissions from multiple base stations 900.1-900.B and all appropriate analog filtering and automatic gain control, $$\underline{r}_a[n] = \sum_{d=-1}^{1}\sum_{k=1}^{N_b} H_{a,k}[d]S_k[n-d]WP_k^{1/2}\underline{b}_k[n-d] + \underline{z}_a[n] \quad \text{Equation 1}$$

with the following definitions $N_b$ is the number of base station identified by the receiver (i.e., those base stations whose. channel gains and spreading sequences are tracked 904);

$\underline{b}_k[n]$ is a column vector that contains the transmitted data vector from base station k in the n-th symbol interval;

$P_k^{1/2}$ is a matrix of user amplitudes for base station k;

$W=[\underline{w}_1 \underline{w}_2 \ldots \underline{w}_{N_c}]$ is an $N_c \times N_c$ matrix whose columns are the common spreading sequences (e.g., Walsh sequences) employed for the channels on all base stations;

$S_k[n]$ is a diagonal matrix that contains base station k's scrambling sequence (e.g., PN cover) during the n-th symbol interval down its main diagonal; for the purpose of power estimation, these are modeled as independent and identically distributed (i.i.d.) complex Bernoulli random variables;

$H_{a,k}[d]$ is the matrix model for the multipath spreading channel linking the k-th transmitter to the a-th antenna of the mobile at delay d, where d=0 corresponds to the current symbol, d=1 to the postcursor symbol, and d=−1 to the precursor symbol (note that the transmitted data symbols are numbered such that all base stations transmit symbol n within one symbol period);

$\underline{z}_a[n]$ is an i.i.d. sequence of additive noise vectors for the processing on the a-th antenna chain with mean zero and covariance $\sigma^2 I$ where $\sigma^2$ accounts for all received power not explicitly modeled (RF noise, unidentified interference, etc.).

If multilevel codes are part of the CDMA network such that some users have shorter spreading sequences than others (e.g., WCDMA/HSDPA), then the terms just described hold with the following modifications $W=[\underline{w}_1 \underline{w}_2 \ldots \underline{w}_{N_c}]$ is an $N_c \times N_c$ matrix whose columns are the common surrogate spreading sequences (e.g., Walsh sequences) that are assumed as-if-employed for the channels on all base stations;

$\underline{b}_k[n]$ is a column vector that contains the surrogate symbols in a transmitted data vector from base station k in the n-th symbol interval;

While the surrogate symbols and sequences are not the actual symbols and sequences employed by some of the users, the estimated powers will still be accurate by virtue of the structure of OVSF (orthogonal variable spreading factor) codes as employed in such CDMA systems. Moreover, the LMMSE and time-averaged LMMSE receivers (which may be employed using parameters determined in this invention) are unchanged even if this surrogate approach is taken. More details are covered in U.S. patent application Ser. No. 11/432, 580, entitled "Interference cancellation in variable code-length systems for multi-access communication," and filed on 11 May 2006, now U.S. Pat. No. 7,697,595, the entire contents of which are hereby incorporated by reference.

The terms in Equation 1 may be consolidated into the following matrix equation $$\underline{r}[n]=H_0[n]P^{1/2}\underline{b}[n]+H_1[n]P^{1/2}\underline{b}[n+1]+H_{-1}[n]P^{1/2}\underline{b}[n-1]+\underline{z}[n] \quad \text{Equation 2}$$

with the definitions b[n] is the column vector obtained by stacking the base station symbol vectors, $\underline{b}_1[n], \ldots, \underline{b}_{N_b}[n]$ into a single vector;

$P^{1/2}=\text{diag}\{P_1^{1/2} \ldots P_{N_b}^{1/2}\}$ is a diagonal matrix with the user powers from each base station down the main diagonal;

$$H_d[n] = \begin{bmatrix} H_{1,1}[d]S_1[n-d]W & \ldots & H_{1,N_b}[d]S_{N_b}[n-d]W \\ \vdots & \ddots & \vdots \\ H_{A,N_b}[d]S_{N_b}[n-d]W & \ldots & H_{A,N_b}[d]S_{N_b}[n-d]W \end{bmatrix}$$

is the effective channel over all antennas (1 to A) and all base stations (1 to $N_b$) at time n and delay d which is estimated 906.

A Rake receiver 907 acting on all identified base stations matches to the effective channel at the n-th symbol interval according to $q[n]=H_0^*[n]r[n]$ which, upon expansion, yields the following model for a single symbol's worth of data:

$$q[n]=R_0[n]P^{1/2}b[n]+L_{-1}[n]P^{1/2}b[n-1]+L_1[n]P^{1/2}b[n+1]+u[n] \quad \text{Equation 3}$$

where $R_0[n]=H_0^*[n]H_0[n]$ is the instantaneous correlation matrix for symbol n (with the superscript * indicating the complex-conjugate transpose operation), $L_{-1}[n]=H_0^*[n]H_{-1}[n]$ is the postcursor transfer matrix, $L_1[n]=H_0^*[n]H_1[n]$ is the precursor transfer matrix, and $u[n]$ is a zero mean additive noise vector with covariance $\sigma^2 R_0[n]$.

Figure 10:
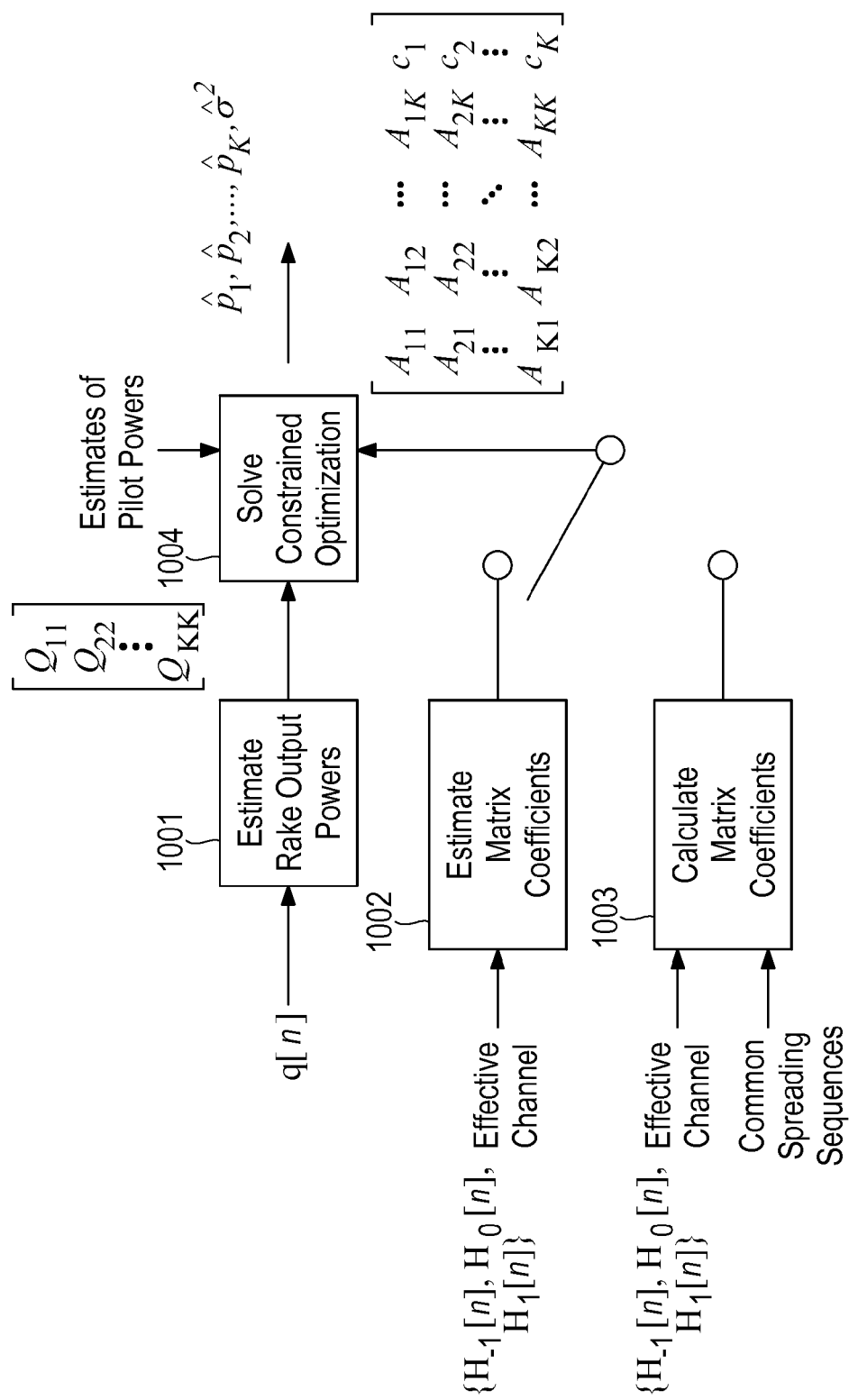
FIG. 10 is a schematic of the estimation of user powers and background noise power.

In order to estimate unknown powers (see FIG. 10), it will be necessary in the sequel to employ the second order statistics of the Rake output. For the n-th symbol interval, the instantaneous statistics conditional on the scrambling sequences are $$(a)\ E\{q[n]\,|\,\{S_1[n-d],\ldots,S_{N_b}[n-d]\}_{d=-1}^1\}=Q \quad \text{Equation 4}$$

$$(b)\ Q[n]=E\{q[n]q^*[n]\,|\,\{S_1[n-d],\ldots,S_{N_b}[n-d]\}_{d=-1}^1\}$$
$$=R_0[n]PR_0[n]+L_{-1}[n]PL_{-1}^*[n]+$$
$$L_1[n]PL_1^*[n]+\sigma^2 R_0^*[n]$$

Another expectation with respect to the scrambling sequences $\{S_k[n-d]\}_{k=1,d=-1}^{N_b,1}$ gives the average (i.e., time-independent) correlation matrix for a fixed set of multipath channels:

$$Q=E\{Q[n]\} \quad \text{Equation 5}$$

The elements of this matrix may be estimated with an empirical average over multiple symbol intervals, e.g.

$$\tilde{Q}=\frac{1}{N}\sum_{n=1}^N q[n]q^*[n],$$

or any other of the various types of moving average or autoregressive estimators. It is only the diagonal elements of this matrix that are of primary interest; these are the RAKE output powers 1001. If an equalizer is used at the front end instead of a Rake, those would also yield a similar set of powers. The key step is to represent them analytically in terms of the quantities that are to be estimated namely the sub channel powers and the background noise power. The k-th RAKE output power, where $k=1, 2, \ldots, K$ with $K=N_b N_c$ (i.e., the total number of subchannels in the system), is expressible as $$Q_{kk}= \quad \text{Equation 6}$$
$$\sum_{j=1}^K (E\{|(R_0)_{kj}[n]|^2\}+E\{|(L_{-1})_{kj}[n]|^2\}+E\{|(L_1)_{kj}[n]|^2\})p_j+$$
$$\sigma^2 E\{(R_0)_{kk}[n]\}$$

where $P_j$ represents the j-th diagonal element of P (i.e., the power of the j-th subchannel in the system). To proceed, it is helpful to simplify the notation according to $$(a)\ A_{kj}=E\{|(R_0)_{kj}[n]|^2\}+E\{|(L_{-1})_{kj}[n]|^2\}+E\{|(L_1)_{kj}[n]|^2\}$$

$$(b)\ c_k=E\{(R_0)_{kk}[n]\} \quad \text{Equation 7}$$

These quantities can be estimated empirically 1002 by any of the variety of moving average or autoregressive estimators. As will be discussed shortly, they may also be calculated using exact analytical formulas 1003 under mild conditions or estimated using approximations of these formulas.

The terms in Equation 6 and Equation 7 can be collected to form a single matrix equation $$\begin{bmatrix} Q_{11} \\ Q_{22} \\ \vdots \\ Q_{KK} \end{bmatrix} = \begin{bmatrix} A_{11} & A_{12} & \ldots & A_{1K} & c_1 \\ A_{21} & A_{22} & \ldots & A_{2K} & c_2 \\ \vdots & \vdots & \ddots & \vdots & \vdots \\ A_{K1} & A_{K2} & \ldots & A_{KK} & c_K \end{bmatrix} \begin{bmatrix} p_1 \\ p_2 \\ \vdots \\ p_K \\ \sigma^2 \end{bmatrix} \quad \text{Equation 8}$$

The left-hand column vector must be estimated, as previously described. The rectangular matrix just to the right of the equal sign may be estimated similarly (as previously discussed), or it may be calculated exactly (to be described shortly). The far-right column vector contains the unknowns that need to be estimated. Notice that there are K+1 unknowns, but only K independent equations, so there is not a unique solution for the unknowns. To remedy this there are several preferred embodiments of the invention. One is to assume that the background noise is weak enough that $\sigma^2$ can be safely ignored, such as in interference-limited scenarios; this leads to K equations and K unknowns. Another preferred embodiment is to take advantage of any base-station pilots. The power of each base-station pilot signal may be accurately estimated with a coherent estimator 1005. First consider only the estimated power of the pilot of the first base station. In other words, let $\tilde{p}_1^{pilot}$ be the coherent estimate of $p_1$. The matrix equation in Equation 8 may be updated in one of two ways, both of which are now described. The first way is to let the estimate of $\hat{p}_1$ be given by $\hat{p}_1=\tilde{p}_1^{pilot}$, and then take that part of the right-hand side of Equation 8 that depends on $p_1$ to the left-hand side; this leads to $$\begin{bmatrix} Q_{11} \\ Q_{22} \\ \vdots \\ Q_{KK} \end{bmatrix} - \tilde{p}_1^{pilot}\begin{bmatrix} A_{11} \\ A_{21} \\ \vdots \\ Q_{K1} \end{bmatrix} = \begin{bmatrix} A_{12} & A_{13} & \ldots & A_{1K} & c_1 \\ A_{22} & A_{23} & \ldots & A_{2K} & c_2 \\ \vdots & \vdots & \ddots & \vdots & \vdots \\ A_{K2} & A_{K3} & \ldots & A_{KK} & c_K \end{bmatrix} \begin{bmatrix} p_2 \\ p_3 \\ \vdots \\ p_K \\ \sigma^2 \end{bmatrix} \quad \text{Equation 9}$$

Note that this now has K independent equations and K remaining unknowns. In general, if this is done for the pilots of all $N_b$ base stations, there will be K independent equations and $K+1-N_b$ remaining unknowns. Alternatively, the matrix equation in Equation 8 may be modified to become $$\begin{bmatrix} Q_{11} \\ Q_{22} \\ \vdots \\ Q_{KK} \\ \tilde{p}_1^{pilot} \end{bmatrix} = \begin{bmatrix} A_{11} & A_{12} & \ldots & A_{1K} & c_1 \\ A_{21} & A_{22} & \ldots & A_{2K} & c_2 \\ \vdots & \vdots & \ddots & \vdots & \vdots \\ A_{K1} & A_{K2} & \ldots & A_{KK} & c_K \\ 1 & 0 & \ldots & 0 & 0 \end{bmatrix} \begin{bmatrix} p_1 \\ p_2 \\ \vdots \\ p_K \\ \sigma^2 \end{bmatrix} \quad \text{Equation 10}$$

in which the equation $\tilde{p}_1^{pilot}=p_1$ has been added. In general, if this is done for the pilots of all $N_b$ base stations, there will be $K+N_b$ independent equations and $K+1$ unknowns. In this case, the final estimates of the base station pilot powers may be different from their coherent estimates. In all methods just described the resulting matrix equation will have at least as many independent equations as there are remaining unknowns. In short, the set of equations may be expressed as $$\underline{y}=X\underline{\theta} \qquad \text{Equation 11}$$

where the column vector $\underline{y}$ and the matrix $X$, which has more rows than columns and possesses full column rank, are both real-valued and known, and the unknown parameters are contained in the column vector $\underline{\theta}$.

The remaining unknowns are found by solving or approximating the solution to a constrained optimization problem such as $$\underline{\hat{\theta}}=\arg\min_{\underline{\theta}}\{\|\underline{y}-X\underline{\theta}\|^2:\theta_k\geq 0 \text{ for all } k\} \qquad \text{Equation 12}$$

where $\|x\|^2=\Sigma_n x_n^2$ is the square of the 2-norm of the real-valued vector $x$. Since the objective function is strictly convex (i.e., since $X$ has full column rank) and the constraint set is a convex set, there is a unique solution. Any exact solution or lower-complexity approximate solution to this problem is part of the invention 1004. Moreover, the invention need not be restricted to this particular objective function. For example, other convex functions such as $g(\underline{x})=\Sigma_n \alpha_n x_n^s$ where $s>0$ and $\alpha_n>0$ for all $n$, are included. The constraint set may also take on different forms to include other known constraints. Given that background noise is always present in a receiver, a tighter lower bound than zero may be set to prevent the estimator from making the estimate of $\sigma^2$ too small. Similarly, if it is known that the power of a subchannel cannot exceed some value (e.g., the power of the pilot from its originating base station), a corresponding upper bound can be used to further restrict the constraint set.

Exact analytical representations for the following matrix $$\begin{bmatrix} A_{11} & A_{12} & \cdots & A_{1K} & c_1 \\ A_{21} & A_{22} & \cdots & A_{2K} & c_2 \\ \vdots & \vdots & \ddots & \vdots & \vdots \\ A_{K1} & A_{K2} & \cdots & A_{KK} & c_K \end{bmatrix}$$

in Equation 8 exist when the common spreading sequences are such that all chip weights have the same magnitude (e.g., Walsh sequences). By way of example, but without any limitations explicit or implied, take $$|W_{ij}|=\frac{1}{N_c}$$

for all elements of the matrix $W$ of common spreading sequences. The scrambling sequences (i.e., PN covers) which make up the diagonal elements of each $S_k[n]$ are taken to be i.i.d. complex Bernoulli random variables that are normalized to have unit variance. It is helpful to arrange the indices by base station and then partition the matrix by base station in the form $$\begin{bmatrix} A_{11} & A_{12} & \cdots & A_{1N_b} & \underline{c}_1 \\ A_{21} & A_{22} & \cdots & A_{2N_b} & \underline{c}_2 \\ \vdots & \vdots & \ddots & \vdots & \vdots \\ A_{N_b 1} & A_{N_b 2} & \cdots & A_{N_b N_b} & \underline{c}_{N_b} \end{bmatrix} \qquad \text{Equation 13}$$

where each $A_{bb'}$, an $N_c \times N_c$ matrix whose row sub-indices correspond base station $b$ and whose column sub-indices correspond to base station $b'$, and each $\underline{c}_b$ is an $N_c \times 1$ vector whose sub-indices correspond to base station $b$. Now make the definitions $$(a) X_{bb'}=H_b^*[0]H_{b'}[0]$$

$$(b) Y_{bb'}=H_b^*[0]H_{b'}[-1]$$

$$(c) Z_{bb'}=H_b^*[0]H_{b'}[1] \qquad \text{Equation 14}$$

For the diagonal blocks when $b=b'$, also define the quantities $$(a)\underline{x}_b=[(X_{bb})_{11}(X_{bb})_{22}\ldots(X_{bb})_{N_c N_c}]^T$$

$$(b)\Delta_b=\text{diag}(|(X_{bb})_{11}|^2,|(X_{bb})_{22}|^2,\ldots,|(X_{bb})_{N_c N_c}|^2) \qquad \text{Equation 15}$$

where the superscript $T$ denote the matrix transpose operation. Then the $(k,j)$ element of $A_{bb}$ is given by $$(A_{bb})_{kj}=\frac{1}{N_c^2}\underline{1}^T\big(N_c^2\big(\underline{x}_b\circ\underline{w}_k\circ\overline{\underline{w}}_j\big)\big(\underline{x}_b\circ\underline{w}_j\circ\overline{\underline{w}}_k\big)^T+ \qquad \text{Equation 16}$$
$$X_{bb}\circ\overline{X}_{bb}+Y_{bb}\circ\overline{Y}_{bb}+Z_{bb}\circ\overline{Z}_{bb}-\Delta_b\big)\underline{1}$$

where the $\circ$ operator denotes the Hadamard (i.e., element-wise) product, $\underline{1}$ is the all-ones $N_c \times 1$ vector, and the overbar notation indicates taking the complex conjugate of every element of the vector or matrix. The off-diagonal blocks are defined by $$A_{bb'}=\{\underline{1}^T(X_{bb'}\circ\overline{X}_{bb'}+Y_{nn'}\circ\overline{Y}_{bb'}+Z_{bb'}\circ\overline{Z}_{bb'})\underline{1}\}E, \qquad \text{Equation 17}$$

where $E$ is the all-ones matrix of dimensions $N_c \times N_c$. The following formula completes the analytical description, $$\underline{c}_b=\frac{\text{trace}(x_{bb})}{N_c}\underline{1} \qquad \text{Equation 18}$$

In one preferred embodiment, the estimates $\hat{p}_1, \hat{p}_2, \ldots, \hat{p}_K$, $\hat{\sigma}^2$ are used in any receiver that requires such values, including the LMMSE receiver, the time-averaged LMMSE receiver, and the optimal maximum-likelihood receiver and many of its suboptimal approximations.

In another preferred embodiment the power estimates are used to estimate the output SINR when a linear receiver is employed. To describe this aspect of the invention, the Rake receiver is considered first and it is then generalized to other linear receivers. The right-hand side of Equation 3 can be expressed in terms of signal plus noise according to $$\underline{q}[n]=R_0[n]P^{1/2}\underline{b}[n]+\underline{i}[n] \qquad \text{Equation 19}$$

where $\underline{i}[n]=L_{-1}[n]P_{1/2}\underline{b}[n-1]+L_1[n]P_{1/2}\underline{b}[n+1]+\underline{u}[n]$ is the interference due to background noise and inter-symbol interference (ISI); it has covariance $$R_{ii}[n]=L_{-1}[n]PL^*_{-1}[n]+L_1[n]PL_1^*[n]+\sigma^2 R_0^*[n] \qquad \text{Equation 20}$$

By way of example, suppose that the SINR of a specific subchannel, k, is desired. Then the k-th element of the Rake output in Equation 19 can be rewritten as $$q_k[n] = \underbrace{(R_0)_{kk}[n]p_k^{\frac{1}{2}}b_k[n]}_{\text{Signal of Interest}} + \underbrace{\sum_{k' \neq k}(R_0)_{kk'}[n]p_{k'}^{\frac{1}{2}}b_{k'}[n]}_{\text{Intra-cell and Inter-Cell Interference}} + \underbrace{i_k[n]}_{\substack{\text{Background Noise} \\ \text{and } ISI}} \quad \text{Equation 21}$$

The output SINR for this subchannel during the n-th symbol interval is thus $$SINR_k[n] = \frac{|(R_0)_{kk}[n]|^2 p_k}{\sum_{k' \neq k}|(R_0)_{kk'}[n]|^2 p_{k'} + (R_{ii})_{kk}[n]} = \frac{N_k[n]}{D_k[n]} \quad \text{Equation 22}$$

These instantaneous SINR estimates may be used in a number of ways.

- The constituent numerator and denominator may each be averaged to obtain, respectively, the means $E\{N_k[n]\}$ and $E\{D_k[n]\}$; their ratio is the average noise power divided by the average interference-plus-noise power.
- The instantaneous SINR may be averaged to obtain an estimate of $E\{SINR_k[n]\}$, the mean Rake SINR.
- The instantaneous symbol error rate (SER) may be approximated for the signal constellation being used (or an assumed constellation if it is unknown) and then averaged to estimate the mean SER, $E\{SER_k[n]\}$; for example, a QPSK constellation has $SER_k[n]=1-(1-Q(SINR_k[n]))^2$, while formulas for other constellations are commonly known to those familiar with the art.
- A bound on the maximum supportable data rate $\eta$ may be obtained by averaging the instantaneous throughput $\log(1+SINR_k[n])$ to obtain an estimate of average throughput $\eta = E\{\log(1+SINR_k[n])\}$ bits per second per Hertz.

Figure 11:
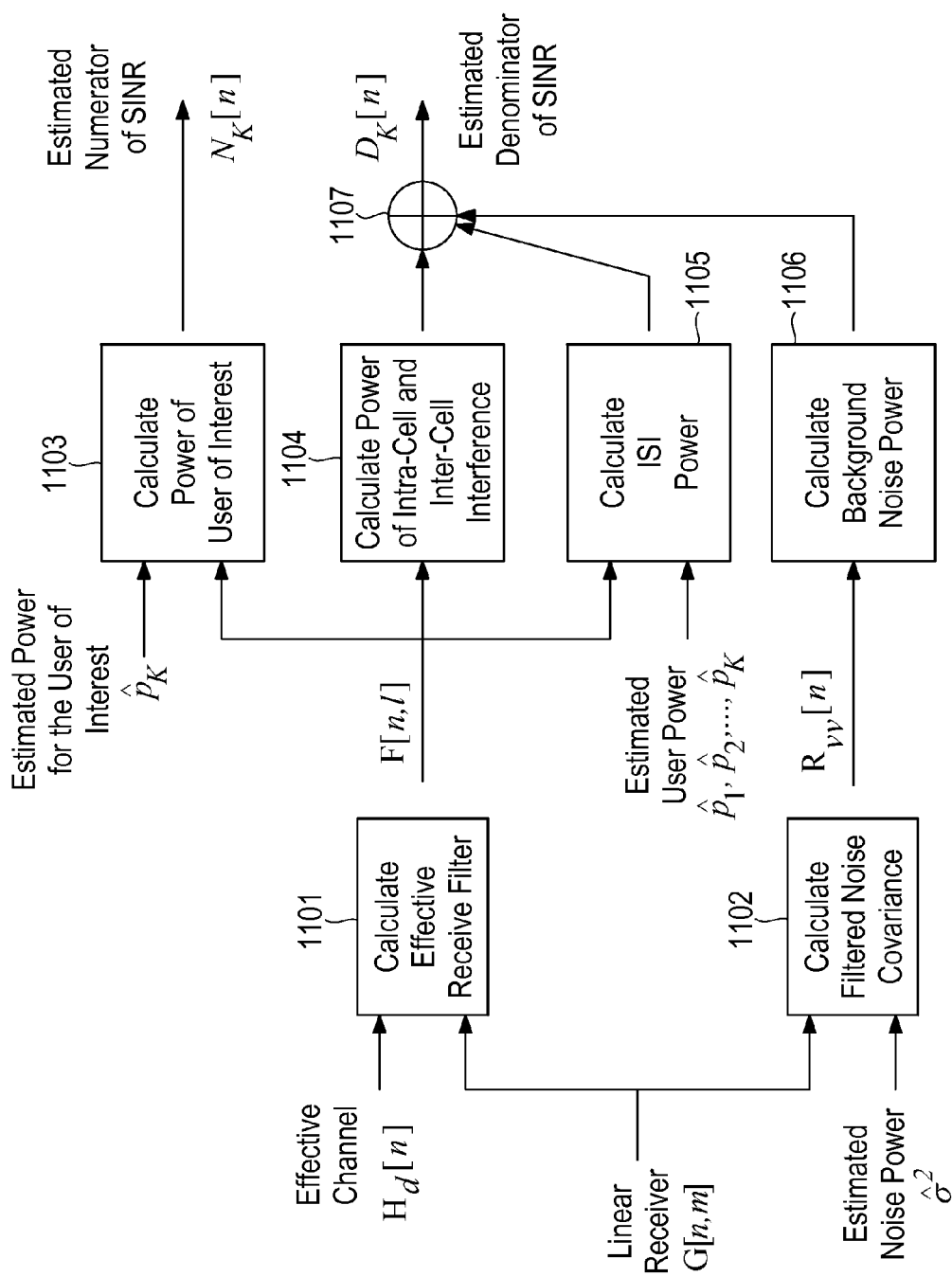
FIG. 11 is a schematic of the estimation of instantaneous signal to interference plus noise ratio for a user of interest.

In a preferred embodiment, and as pictured in FIG. 11, a suitable channel quality estimator of any linear receiver can be obtained in a manner analogous to that described for the Rake receiver. The output of a general linear receiver may be expressed as $$q^{linear}[n] = \sum_{m=-M}^{M} G[n,m] \underline{r}[n-m] \quad \text{Equation 23}$$

where G[n,m] is a matrix valued filter whose entries may vary with the symbol time n, as in the exact time-varying LMMSE receiver; or may be time-invariant, as in the case of the time-averaged LMMSE receiver (e.g., the Type 2 and Type 2i receivers considered in the 3GPP standards body for WCDMA/HSDPA networks). For the case of time-invariant reception, the matrix valued coefficients can be expressed as G[n−m] and the receiver is performing standard discrete-time convolution. A substitution for $\underline{r}[n-m]$ in Equation 23 using Equation 2 yields $$q_{linear}[n] = \sum_{l=-M-1}^{M+1} F[n,l]P^{1/2}b[n-l] + v[n] \quad \text{Equation 24}$$

where

F[n,l] is the effective channel-plus-receiver 1101 filter and has matrix values defined by $$F[n,m] = \sum_{d=-1}^{1} G[n,m+d]H_d[n+m-d]\Psi_{[-M-d,M-d]}[m]$$

where $$\Psi_{[-M-d,M-d]}[m] = \begin{cases} 1, & -M-d \leq m \leq M-d \\ 0, & \text{else} \end{cases}$$

v[n] is a vector of filtered noise with correlation matrix 1102

$$R_{vv}[n] = \sigma^2 \sum_{m=-M}^{M} G[n,m]G^*[n,m]$$

This may be reworked to combine the background noise with the ISI to give $$q^{linear}[n] = F[n,0]P^{\frac{1}{2}}b[n-l] + \sum_{l \neq 0} F[n,l]P^{1/2}b[n-l] + v[n] \quad \text{Equation 25}$$

i[n]: Background Noise and ISI where the interference has covariance $$R_{ii}[n] = \underbrace{\sum_{l \neq 0} F[n,l]PF^*[n,l]}_{\text{ISI Covariance}} + \underbrace{R_{vv}[n]}_{\substack{\text{Background Noise} \\ \text{Covariance}}} \quad \text{Equation 26}$$

Focusing on a single subchannel, the k-th element of Equation 25 may be expressed as $$q_k^{linear}[n] = \underbrace{(F[n,0])_{kk}[n]p_k^{1/2}b_k[n]}_{\text{Signal of Interest}} + \underbrace{\sum_{k' \neq k}(F[n,0])_{kk'}p_{k'}^{1/2}b_{k'}[n]}_{\text{Intra-cell and Inter-Cell Interference}} + \underbrace{i_k[n]}_{\substack{\text{Background Noise} \\ \text{and } ISI}} \quad \text{Equation 27}$$

The remaining calculations to determine the SINR are $$SINR_k[n] = \frac{|(F[n,0])_{kk}[n]|^2 p_k}{\sum_{k' \neq k}|(F[n,0])_{kk'}[n]|^2 p_{k'} + (R_{ii})_{kk}[n]} = \frac{N_k[n]}{D_k[n]} \quad \text{Equation 28}$$

and as shown in FIG. 11 (numerator 1103 and denominator consisting of the sum 1107 of intra-cell and inter-cell interference power 1104, ISI power 1105, and background noise power 1106). In this manner, estimates of the output SINRs and achievable rates may be obtained for any linear receiver. In a preferred embodiment, one or more of the matrices which define the interference correlation matrix in Equation 26 may be removed from the calculation to simplify the resulting computation. Any of the uses for the instantaneous SINR that were described in the context of the RAKE are equally applicable to an arbitrary linear receiver.

In some embodiments, at least some of the hardware from the fingers in the Rake 416 is reused in SMG 404. The interference vectors generated by SMG post processor 308, using information from SMG 404, are cancelled out from Raw IQ data in cancellation Operator 412. Only one cancellation operator is shown, though actual implementations may have multiple operators. The cancellation Operator 412 may cancel the data at either chip-level, sample level or symbol level, depending on how it is architected. The cancellation may be carried out either explicitly by a subtraction, or by implicitly creating a signal stream with the interference removed. In another embodiment of the SMG block 404, the pilot chips and the covering block 716, 720, and 724 outputs are not time-division multiplexed, but rather, they are simply passed to the SMG Post Processor 408. One advantage of this scheme is that the cancellation Operator 412 may cancel out each pilot, MAC, and data channel independently of one another. Control Unit 428 may adapt the cancellation operator for each channel depending on operating conditions.

The SMG Post Processor 408 outputs estimated interference vectors, which may be used for cancellation in any of the active fingers $F_1$ through $F_L$. For example, if only $F_1$ and $F_2$ are active, the first output of block 408 is time-aligned with $F_2$ and cancelled out of the received signal by Cancellation Operator 412. The resulting interference-cancelled signal is passed to $F_1$. Similarly the second output of block 408 is time-aligned with $F_1$ and cancelled. The resulting interference-cancelled signal is passed to $F_2$ in the Rake 416.

The Rake 416 combines both paths to maximize reliability of the combined signal. If there are improvements to the SNR measurement for cancelled signals on individual fingers, the SNR of the combined signal should be higher than the SNR of the uncancelled signal. Similarly, in the case of three multipaths assigned to three input fingers $F_1$, $F_2$, and $F_3$ respectively, the interference vectors constructed from $F_1$, $F_2$, and $F_3$ will be provided to the SMG Post processor 408. In one embodiment, SMG post processor 408 may concatenate the $F_2$ and $F_3$ interference vectors/matrices into one matrix. This would result in a serial cancellation operation. The serial cancellations described herein may improve signal to noise ratio ("SNR") for a signal of interest ("SOI") by successively and substantially canceling, or removing, interfering signals. The number of serial interference cancellations is a matter of design choice, taking into account factors, such as the number of available processing fingers, processor speed and/or acceptable time delays associated with successive cancellations. For example, the number of successive cancellations performed on an interference canceled output signal may be based on the processing constraints within a receiver.

Specifically, $F_2$ and $F_3$ would be cancelled in a serial order from the IQ data, thus providing a cleaner IQ signal to demodulate path $F_1$. In another embodiment, the SMG post processor 408 may perform a linear combination of interference vectors from $F_2$ and $F_3$ to produce a new interference vector prior to cancellation.

In one embodiment, the SMG Post Processor 408 processes the interference vector output from the SMG 404 and uses alignment and phase information from the Rake 416 to generate composite interference vectors. Each of the composite interference vectors is aligned to a different finger corresponding to a particular active finger. The number of composite interference vectors may be limited by a number of maximum cancellation operations that can be performed with the given hardware.

These composite interference vectors are input to the Cancellation Operator block 412, which is configured to project and/or subtract out the composite interference vectors from the baseband IQ data received at point A. Even when the canceller 412 is configured to perform multiple iterations, interference cancellation is performed on the original received baseband IQ signal for each iteration. If the first iteration of interference cancellation improves the combined SNR relative to the combined SNR of the uncancelled signal, then further iterations will typically improve the SNR, since the interference vector will be estimated from a signal having an improved SNR. Improved estimation of the interference vector may provide for better interference cancellation and improve the combined SNR.

Outputs of the Decover block 424 may be saved in memory 456. Signals from the memory 456 and the canceller 412 are input to the Switch 452. The memory 456 is initially loaded with decovered data from the baseband IQ signal. After a first iteration, the Rake 416 may combine the interference-cancelled data from the Rake fingers and provide it to the Decover block 424. If the Control Unit 428 halts iterations of the Canceller 412, decovered data from block 424 bypasses the Canceller 412 and is input to the Switch 452. Thus, decovered data from the memory 456 and interference-cancelled decovered data are input to the switch 452.

The Control Unit 428 may be configured to process signal-quality estimates for both uncancelled and cancelled data from the Rake 416. In one embodiment, the Control Unit 428 may select which of the uncancelled and cancelled data provides the best decovered data estimates. The selected data estimates are routed by the Control Unit 428 to the decoder 448. Upon each iteration of interference cancellation, the Control Unit 428 may either reload the memory with new cancelled data from the current iteration or retain the present data. Upon a final iteration, the latest interference-cancelled decovered data is coupled to the Switch 452.

Signal-quality estimates from the Rake receiver are output to the Control Unit 428, which may include a bidirectional bus connecting to the Canceller 412 via which it can receive data from the Canceller 412 and enable or disable the Canceller 412. The Control Unit 428 may also have a bidirectional bus connecting to the memory 456 via which it can receive data from the memory and also reset it.

In one embodiment, the Control Unit 428 may be employed when the Rake 416 has only one finger active. Since there is no structured interference to estimate and cancel, the Canceller 412 does not provide any gains. Thus, the Control Unit 428 may be configured to disable the Canceller 412. Similarly, the Canceller may be disabled when the data being demodulated has strict latency requirements (e.g. for Voice over Internet Protocol) and performing a subsequent iteration would compromise delay requirements. In another embodiment, the Control Unit 428 may be configured to detect if the current slot's data is intended for demodulation. If demodulation is not anticipated, the Control Unit 428 may disable the Canceller 412. The Control Unit 428 may be configured for selecting one or more dynamically changing parameters, including CNA Buffer depths.

Figure 12:
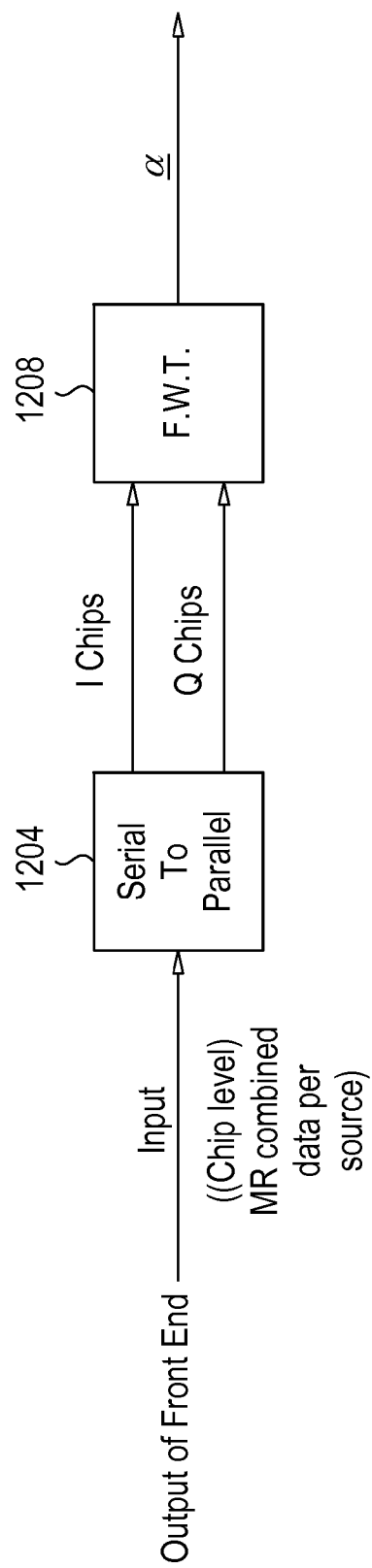
FIG. 12 shows a Decover block configured to operate in a system complying with the CDMA 2000 1xRTT standard.

FIG. 12 shows a Symbol estimator (Decover) block 424 configured to operate in a system complying with the CDMA 2000 1xRTT standard or the WCDMA/HSPA standard. Signals output from the Rake 416 are coupled to Fast Walsh Transform (FWT) 1208 after passing through a serial to parallel block 1204. The FWT 1208 produces a vector of Walsh energies denoted by α, which is provided to the SMG 404.

Figure 13:
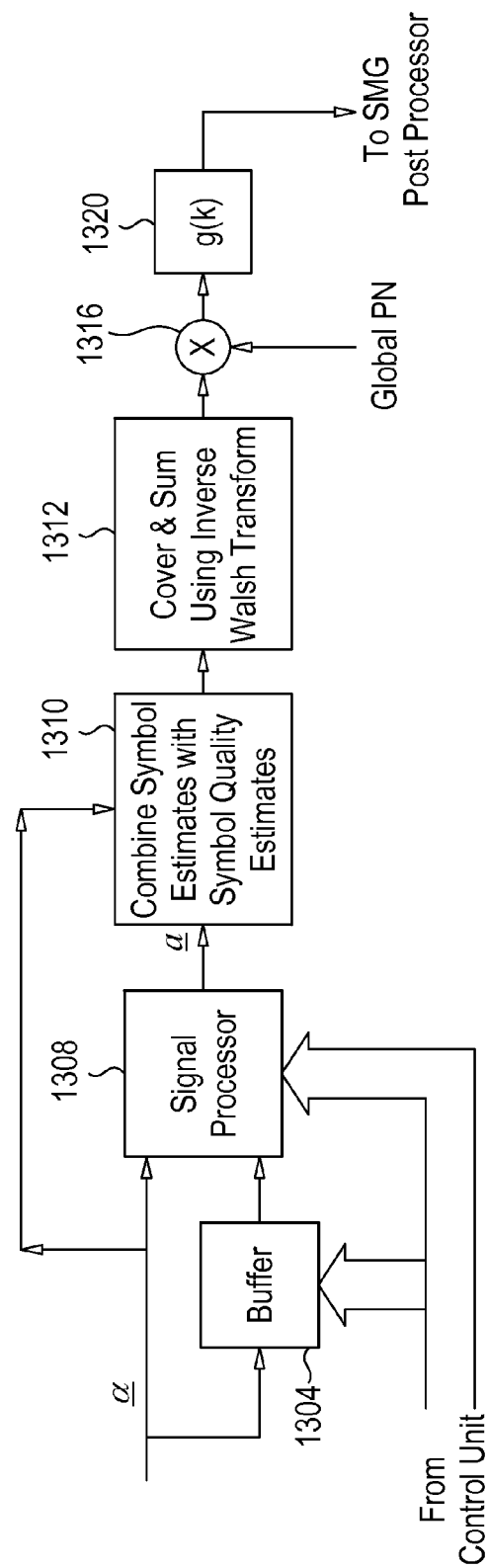
FIG. 13 shows an SMG configured to operate in a system complying with the CDMA 2000 1 xRTT standard.
Figure 14:
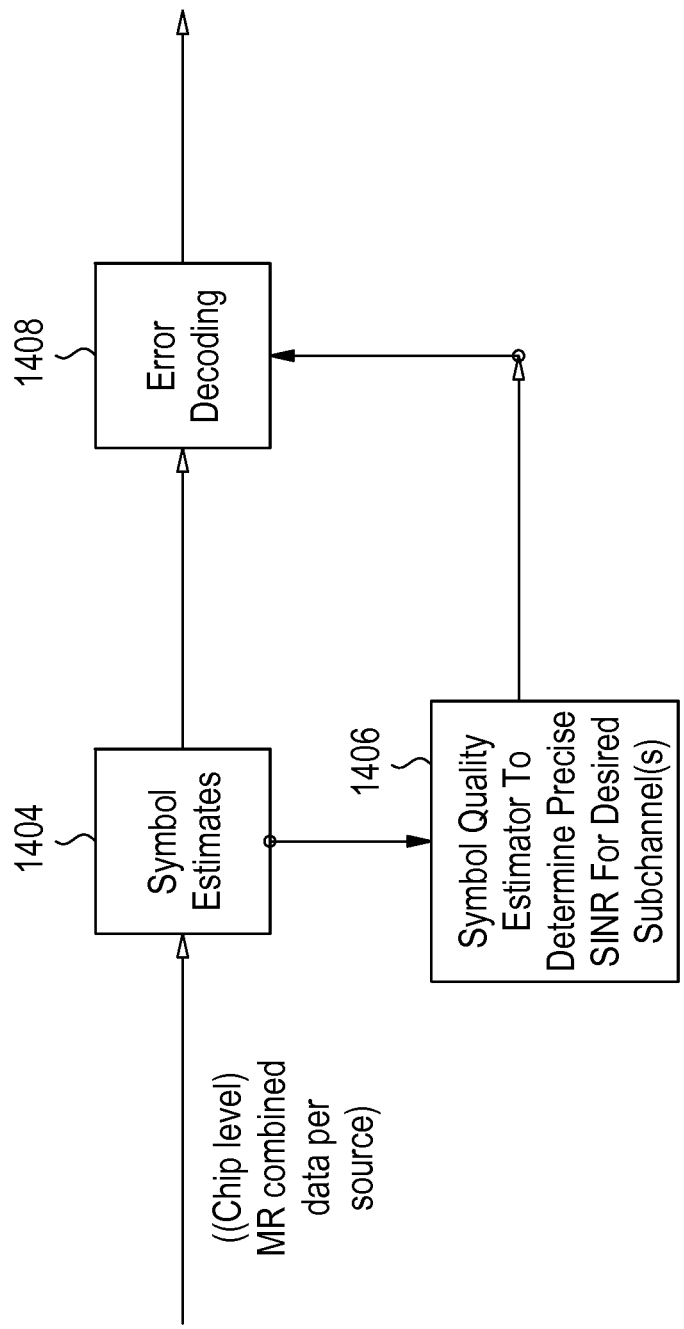
FIG. 14 illustrates an error decoding operation built as an embodiment of this invention.

The vector α is also input to buffer 1304 and Signal Processor 1308 shown in FIG. 13. The depth of the buffer 1304 may be determined by the Control Unit 428, which may provide for dynamic control as channel conditions and signal-quality requirements vary. The buffer 1304 output is provided to the Signal Processor 1308, which calculates the time-averaged signal strength corresponding to each of the Walsh codes. The signal processor 1308 may use a variety of techniques for computing averaged strengths including filters such as FIRs and IIRs. These filters may be configurable for different time-constants, and may be programmed to reset on frame boundaries. They may also have dynamic time-constants so that at start-up, they quickly ramp up, and then later, move to a longer time-constant so that better averaging may be performed. The time-constants (which are related to the co-efficients used in the filters) may be also be adjusted based on the fading speed detected or known by the receiver. The signal processor, which performs the function of the symbol quality estimator, may also generate estimates of the noise and interference power, and a figure of merit per subchannel, such as the SINR. It may also compute a set of weights per subchannel.

The signal processor is used in the symbol quality estimator in refining the raw symbol estimates through weighing or thresholding.

In weighing, the symbol estimates received are weighed by some figure of merit of those symbol estimates, such as SINR, or signal strength, as described earlier in the specification. The weights, a are computed and applied as shown in FIG. 8.

In thresholding, the time-averaged strengths are used for selecting a subset of the Walshes for interference vector construction. In one embodiment, the Signal Processor 808 may use the averaged amplitude (which may be calculated from a filter or derived from averaged strengths) and the sign of the current symbol for each Walsh code to reconstruct the interference vector. As an example of subset selection, all Walsh codes with average strengths below a certain threshold may be discarded for interference vector/matrix construction. Thresholding can also be viewed as a very special case of weighing, where weights of one or zero are applied, based on whether the symbol estimate crosses a certain threshold or not.

The symbol estimates are then combined with the weights generated by the signal processor 1308 in a processor 1310 that combine the two to generate an interference vector. The interference vector then goes through a covering and sum operation in an Inverse Fast Walsh Transform module, after which the Spreading code for that source is applied in 1316.

In one embodiment, information from different paths may be weighted in the ratio of their strengths or signal quality estimates, and then combined. Another embodiment may estimate the interference vector on a per-finger basis. In SMGOne, cancellation of interference from multipaths is performed using interference estimates derived from only the strongest path originating from a sector. This technique assumes that the transmitted symbols from the sector are identical across all paths. Thus, the strongest path provides the best sign and amplitude estimates for all paths from that sector. Each path experiences an independent fading profile, and individual channel estimates (phase estimates derived from the pilot) may be used to properly reconstruct the interference for each path prior to interference cancellation. The estimated interference vector from the strongest multi paths may be used to cancel out interference from other multi paths of the strongest path.

Interference cancellation may be performed either through projection or subtraction. Projection-based cancellation may require more operations than subtraction based methods. But projection-based methods may be less sensitive to estimation errors, and they are invariant to scaling errors. Thus, the Control Unit 328 may be configured to switch between subtraction and projection depending on reliability of the estimated interference vector. If the reliability exceeds a predetermined dynamic/static threshold, then subtraction may be used. Alternatively, a projection operation may be performed. A projection may be preferred over subtraction when the path strengths are small or when the fading coefficients are highly uncorrelated over time. Embodiments of this invention may be realized by either subtraction based or projection based cancellation modules, as well as having a configurable canceller that switches between the methods depending on the estimation quality.

All paths input to the SMG should be multi paths from a common signal source (Base station sector or Node-B, for example). For example, in CDMA2000 and in HSDPA/WCDMA, the control unit distinguishes multi paths from other base station soft handoff paths and assigns the paths to the SMG. The control unit assigns the other active paths from the base station in soft handoff to a second vector estimation block, if available.

The estimation and cancellation embodiments described herein may be adapted to systems employing transmit and receive diversity. When multiple transmit and receive antennas are employed, it is more likely that Rake fingers are locked to stronger multipaths. Thus, better interference estimation may be performed using SMG and SMGOne schemes. In one embodiment, the control unit may switch between SMG and SMGOne schemes based on multi path and interference profiles. Alternatively, maximal ratio combining schemes may be employed with receive diversity, as is well known in the art.

Estimation of the interference vector may be further improved if the symbol quality estimator (SMG) is positioned following an error decoder (not shown). The cancellation operation may be performed at symbol level, chip level, or sample level. Since pilot symbols are known at the receiver, the interference due to a pilot signal may be estimated with higher accuracy than interference from data or Mac signals. An IS-856 system uses signal estimates from the pilot channel and a look up table (LUT) to determine the data rates. Since cancellation affects data and pilot signals in different ways, the LUT may be modified to account for this imbalance. Alternatively, an access terminal may estimate channel quality on uncancelled pilot channels.

Another embodiment of this invention may be used in error decoding where the symbol estimator 1404 generates multiple symbol estimates, including those from subchannels that are not being used in demodulation, which are then used to compute symbol quality estimates of the subchannel(s) of interest taking into account the noise and interference experienced by the subchannel(s) of interest in 1406. The symbol estimates along with its symbol estimate quality are together processed in error decoder 1408, and the decoded symbols used in further post-processing.

It is clear that the methods described herein may be realized in hardware or software, and there are several modifications that can be made to the order of operations and structural flow of the processing. Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, YHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. These functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope.

For example, a MIMO-Spread spectrum transmitter and receiver may code symbol sequences from one or more users onto a transmitter array for transmission over a channel to a receiver array. The transmitter would typically code the symbols across spread-spectrum subchannels and multiple antennas. The space-time coding and the frequency-selective space-time channel introduce correlation across subchannels and receive antennas, and this correlation must be accounted for in the iterative interference canceller, such as previously described.

Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

We claim:

1. A receiver comprising a processor configured for:
   receiving a combined signal, the combined signal comprising fewer than all available signal paths and sectors;
   processing the combined signal to produce one or more symbol estimates;
   operating on the one or more symbol estimates to generate one or more symbol quality estimates based on the one or more symbol estimates; and
   combining the one or more symbol estimates with the one or more symbol quality estimates for at least one of a plurality of user subchannels.

2. The receiver recited in claim 1, further comprising a post-processing module configured for generating at least one interference vector.

3. The receiver in claim 1, further comprising an interference suppressor module configured for suppressing interference from at least one received signal from at least one of the available signal paths and sectors for producing at least one interference-suppressed signal.

4. The receiver recited in claim 1, wherein the combined signal is received from a front end comprising a plurality of fingers and a finger combiner.

5. The receiver recited in claim 4, wherein plurality of fingers comprises a single finger configured for processing multipaths in a Time Division Multiplex mode.

6. The receiver recited in claim 1, wherein the combined signal is received from a Rake receiver.

7. The receiver recited in claim 1, wherein the combined signal is received from an equalizer.

8. The receiver recited in claim 4, wherein the processor is further configured to output a global pseudo-noise (PN) sequence and alignments of PN sequences of each of the plurality of fingers with respect to the global PN sequence.

9. The receiver recited in claim 4, wherein the finger combiner is configured to weight at least one of the plurality of received signals.

10. The receiver recited in claim 3, further comprising a control unit configured to produce a routing decision based on estimated signal quality for each interference-suppressed signal and estimated signal quality from at least one received signal from at least one of the available signal paths and sectors.

11. The receiver recited in claim 1, further comprising:
    a demultiplexer configured to separate data/preamble chips, Mac chips, and pilot chips;
    a data/preamble discriminator to distinguish between data and preamble chips; and
    a Walsh decover block configured to produce the decovered data.

12. The receiver recited in claim 1, further comprising at least one filter configured for filtering at least one of the symbol estimates.

13. The receiver recited in claim 1, wherein the processor further is configured for deriving an average signal strength over at least one of time and different Walsh codes.

14. The receiver recited in claim 3, wherein the interference suppressor is configured for performing at least one of a projection and a subtraction.

15. The receiver recited in claim 3, further comprising a control unit configured to adapt the interference suppressor for each channel depending on operating conditions.

16. The receiver recited in claim 1, wherein the processor is further configured for generating at least one weight based on at least one of the symbol estimates.

17. The receiver recited in claim 1, wherein the processor is further configured to use a Fast Hadamard Transform to compute the symbol estimates.

18. The receiver recited in claim 1, wherein the processor is further configured to use a Fast Fourier Transform to compute the symbol estimates.

19. The receiver recited in claim 1, wherein the processor is further configured to compute an SINR of at least one of the plurality of user subchannels.

20. The receiver recited in claim 1, wherein the processor is further configured to calculate a noise power based on one or more known pilot bits.

21. The receiver recited in claim 1, wherein the processor is further configured to use estimates of at least one of the plurality of user subchannels and one or more noise power estimates to compute an interference power.

22. The receiver recited in claim 1, where the processor and an interference suppressor are coupled serially from one source to another.

23. The receiver recited in claim 1, where the processor and an interference suppressor are coupled in parallel for a plurality of sources.

24. A reception method comprising:
receiving a combined signal, the combined signal derived from one or more received signals received from a plurality of fingers, the plurality of signals comprising fewer than all available signal paths and sectors for use in producing a combined signal;
processing the combined signal to produce one or more symbol estimates;
operating on the one or more symbol estimates to generate one or more symbol quality estimates; and
combining the said one or more symbol estimates with the one or more symbol quality estimates for at least one of a plurality of user subchannels.

25. The method recited in claim 24, further comprising generating at least one interference vector.

26. The method recited in claim 24, further comprising suppressing interference from at least one received signal to produce at least one interference-suppressed signal.

27. The method recited in claim 24, wherein the combined signal is derived using a single finger configured for processing multipaths in a Time Division Multiplex mode.

28. The method recited in claim 24, wherein the combined signal is derived by a Rake receiver.

29. The method recited in claim 24, wherein the combined signal is derived by an equalizer.

30. The method recited in claim 24, wherein the combined signal is derived at least in part by producing a global pseudo-noise (PN) sequence and alignments of PN sequences of each of the plurality of fingers with respect to the global PN sequence.

31. The method recited in claim 24, wherein the combined signal is derived at least in part by weighting at least one received signal.

32. The method recited in claim 24, further comprising producing a routing decision based on estimated signal quality for each interference-suppressed signal and estimated signal quality from at least one received signal.

33. The method recited in claim 24, wherein processing the combined signal to produce symbol estimates further comprises:
separating data/preamble chips, Mac chips, and pilot chips:
distinguishing between data and preamble chips: and
performing Walsh decovering to produce the decovered data.

34. The method recited in claim 24, further comprising filtering at least one of the symbol estimates.

35. The method recited in claim 24, further comprising deriving an average signal strength over at least one of time and a plurality of Walsh codes.

36. The method recited in claim 26, wherein suppressing comprises performing at least a projection operation or a subtraction.

37. The method recited in claim 26, further comprising adapting suppression for each channel depending on operating conditions.

38. The method recited in claim 24, wherein operating on the symbol estimates to generate symbol quality estimates comprises generating at least one weight based on one or more of the symbol estimates.

39. The method recited in claim 24, wherein processing the combined signal to produce symbol estimates comprises using a Fast Hadamard Transform to compute the symbol estimates.

40. The method recited in claim 24, wherein processing the combined signal to produce symbol estimates comprises using a Fast Fourier Transform to compute the symbol estimates.

41. The method recited in claim 24, wherein operating on the symbol estimates to generate symbol quality estimates comprises computing an SINR of at least one of the plurality of user subchannels.

42. The method recited in claim 24, wherein operating on the symbol estimates to generate symbol quality estimates comprises using knowledge of one or more known pilot bits to calculate a noise power.

43. The method recited in claim 24, wherein operating on the symbol estimates to generate symbol quality estimates comprises using estimates of a plurality of subchannels and one or more noise power estimates to compute an interference power.

44. The method of claim 26, wherein suppressing interference is performed serially from one source to another.

45. The method of claim 26, where suppressing interference is performed in parallel for a plurality of sources.

46. A handset configured to perform the method recited in claim 24.

47. A chipset configured to perform the method recited in claim 24.

48. A digital computer system programmed to perform the method recited in claim 24.

49. A computer-readable medium storing a computer program implementing the method of claim 24.

50. A base station configured to perform the method of claim 24.

51. A user-channel quality estimator comprising:
a processor configured for
calculating an effective receive filter;
calculating a desired user's instantaneous output power; and
calculating one or more instantaneous powers of interference, wherein the one or more instantaneous powers of interference comprise one or more of background noise, inter-symbol interference, intra-cell interference and inter-cell interference.

52. The user-channel quality estimator of claim 51, wherein the processor is further configured for determining the channel quality by:
averaging one or more output powers of one or more desired users to produce an average output power;

averaging one or more instantaneous interference powers to produce an average instantaneous power of interference; and evaluating the ratio of the average output power to the average instantaneous power of interference.

53. The user-channel quality estimator of claim 51, where the channel quality is measured by averaging the ratio of instantaneous user-of-interest power divided by the instantaneous interference power.

54. The user-channel quality estimator of claim 51, further comprising measuring channel quality by evaluating a function of ratios of the desired user's instantaneous output power divided by the instantaneous power of interference over multiple symbol instants.

55. The user-channel quality estimator of claim 54, wherein the function estimates the average symbol error rate of one of a known signaling constellation or an assumed signaling constellation.

56. The user-channel quality estimator of claim 54, where the function estimates the maximum average data-rate that could be reliably transmitted to the desired user from its serving base station.

57. A method for estimating user-channel quality comprising:
  configuring a processor to
    calculate an effective receive filter;
    calculate instantaneous user-of-interest power; and
    calculate at least one instantaneous interference power, wherein the at least one instantaneous interference power comprises one or more of background noise, inter-symbol interference, intra-cell interference and inter-cell interference.

58. The method recited in claim 57, wherein the processor is further configured for:
  averaging the instantaneous user-of-interest power;
  averaging the instantaneous interference power; and
  evaluating the ratio of instantaneous user-of-interest power to instantaneous interference power.

59. The method recited in claim 57, wherein the processor is further configured for averaging the ratio of instantaneous user-of-interest power divided by the instantaneous interference power.

60. The method recited in claim 57, wherein the processor is further configured for evaluating a function of ratios of instantaneous user-of-interest power divided by instantaneous interference power over multiple symbol instants.

61. The method recited in claim 60, wherein the function estimates the average symbol error rate of least one of a known signaling constellation or an assumed signaling constellation.

62. The method recited in claim 60, wherein the function estimates the maximum average data-rate that could be reliably transmitted to a user-of-interest from its serving base station.

* * * * *